US009099890B2

(12) United States Patent
Vukojevic et al.

(10) Patent No.: US 9,099,890 B2
(45) Date of Patent: Aug. 4, 2015

(54) APPARATUS FOR DECENTRALIZED COORDINATED VOLT/VAR CONTROL (CVVC)

(75) Inventors: Aleksandar Vukojevic, Atlanta, GA (US); Borka Milosevic, Atlanta, GA (US)

(73) Assignee: General Electric Company, Schenectady, NY (US)

(*) Notice: Subject to any disclaimer, the term of this patent is extended or adjusted under 35 U.S.C. 154(b) by 1030 days.

(21) Appl. No.: 13/186,216

(22) Filed: Jul. 19, 2011

(65) Prior Publication Data

US 2013/0024032 A1    Jan. 24, 2013

(51) Int. Cl.
*G06F 1/28* (2006.01)
*H02J 3/18* (2006.01)
*H02J 13/00* (2006.01)

(52) U.S. Cl.
CPC ........... *H02J 3/1828* (2013.01); *H02J 13/0006* (2013.01); *H02J 13/001* (2013.01); *H02J 13/0062* (2013.01); *H02J 13/0075* (2013.01); *H02J 13/0079* (2013.01); *Y02E 40/30* (2013.01); *Y02E 40/74* (2013.01); *Y02E 60/7838* (2013.01); *Y02E 60/7853* (2013.01); *Y04S 10/22* (2013.01); *Y04S 10/40* (2013.01); *Y04S 40/124* (2013.01); *Y04S 40/126* (2013.01)

(58) Field of Classification Search
CPC ... H02J 3/1828; H02J 13/0006; H02J 13/001; Y02E 40/30; Y04S 10/22
USPC ................................................. 700/286, 297
See application file for complete search history.

(56) References Cited

U.S. PATENT DOCUMENTS

| 4,234,843 A | 11/1980 | Gyugyi et al. |
| 4,413,189 A | 11/1983 | Bottom, Jr. |
| 4,769,587 A | 9/1988 | Pettigrew |
| 4,857,821 A | 8/1989 | Takeda |

(Continued)

FOREIGN PATENT DOCUMENTS

| WO | 2005/085970 A1 | 9/2005 |
| WO | 2005085970 A1 | 9/2005 |
| WO | 2008025162 A1 | 6/2008 |

OTHER PUBLICATIONS

Milosevic, "Capacitor Placement for Conservative Voltage Reduction on Distribution Feeders", Jul. 2004, 1360-1367.*

(Continued)

*Primary Examiner* — Kenneth Lo
*Assistant Examiner* — Olvin Lopez Alvarez
(74) *Attorney, Agent, or Firm* — Armstrong Teasdale LLP

(57) ABSTRACT

A system for enhancing decentralized coordinated Volt/Var control (CVVC) includes a memory device configured to store a plurality of operational measurements of an electric distribution system. The electric distribution system includes a plurality of capacitive devices. The system also includes a processor coupled in communication with the memory device. The processor is programmed to determine a plurality of potential configurations for the plurality of capacitive devices. The processor is also programmed to determine a priority of switching of each of the plurality of capacitive devices as a function of at least one of at least one actual voltage measurement of the electric distribution system, at least one power factor determination of the electric distribution system, at least one voltage parameter, at least one power factor parameter, and an availability of each of the capacitive devices.

20 Claims, 10 Drawing Sheets

(56) References Cited

U.S. PATENT DOCUMENTS

| | | | |
|---|---|---|---|
| 4,891,569 A * | 1/1990 | Light | 323/210 |
| 5,117,175 A | 5/1992 | Pettigrew et al. | |
| 5,422,561 A | 6/1995 | Williams et al. | |
| 5,539,653 A | 7/1996 | Pomatto | |
| 5,541,498 A | 7/1996 | Beckwith | |
| 5,670,864 A * | 9/1997 | Marx et al. | 323/211 |
| 5,798,634 A | 8/1998 | Terada et al. | |
| 5,900,723 A | 5/1999 | Rostron | |
| 6,925,362 B2 | 8/2005 | Machitani et al. | |
| 7,069,117 B2 | 6/2006 | Wilson et al. | |
| 7,071,933 B2 * | 7/2006 | Yun | 345/211 |
| 7,288,921 B2 | 10/2007 | Huff et al. | |
| 7,474,080 B2 | 1/2009 | Huff et al. | |
| 8,076,910 B2 * | 12/2011 | Bickel | 323/205 |
| 8,121,741 B2 * | 2/2012 | Taft et al. | 700/295 |
| 8,599,584 B2 * | 12/2013 | Zhang | 363/37 |
| 8,639,389 B2 * | 1/2014 | Vukojevic et al. | 700/286 |
| 2008/0106241 A1 | 5/2008 | Deaver et al. | |
| 2008/0195255 A1 | 8/2008 | Lutze et al. | |
| 2009/0265042 A1 | 10/2009 | Mollenkopf et al. | |
| 2010/0114398 A1 | 5/2010 | Feng et al. | |
| 2010/0198422 A1 | 8/2010 | Feng | |
| 2010/0204851 A1 | 8/2010 | Yuen et al. | |
| 2010/0315190 A1 * | 12/2010 | Haj-Maharsi et al. | 336/192 |
| 2011/0169461 A1 * | 7/2011 | Deaver, Sr. | 323/209 |
| 2012/0133209 A1 * | 5/2012 | O'Brien et al. | 307/72 |
| 2012/0290103 A1 * | 11/2012 | Dam | 700/12 |
| 2012/0296491 A1 * | 11/2012 | Schmid | 700/298 |
| 2013/0030579 A1 * | 1/2013 | Milosevic et al. | 700/286 |
| 2013/0030584 A1 * | 1/2013 | Milosevic et al. | 700/291 |
| 2013/0030586 A1 * | 1/2013 | Milosevic et al. | 700/292 |
| 2013/0030597 A1 * | 1/2013 | Milosevic et al. | 700/298 |
| 2013/0030598 A1 * | 1/2013 | Milosevic et al. | 700/298 |
| 2014/0148966 A1 * | 5/2014 | Salama et al. | 700/298 |

OTHER PUBLICATIONS

Chis et al, "Capacitor placement in distribution systems using heuristic search strategies", 1997, pp. 225-230.*

Roytelman et al, "Voltivar Control Algorithm for Modern Distribution Management System", Aug. 1995, pp. 1454-1460.*

Aquino-Lugo et al, "Agent Technologies for Control Applications in the Power Grid", 2010, pp. 1-10.*

Rugthaicharoencheep et al , "Feeder Reconfiguration with Dispatchable Distributed Generators in Distribution System by Tabu Search", 2009, pp. 5.*

Cooper Industries, "CymeExpress Seminar: Impact of the Smart Grid on the Distribution Network", May 2009, pp. 2.*

CYME International, "CYME 5.02 CYMDIST Basic Analyses Users Guide", Jan. 2011, pp. 120.*

Kojovic et al, "Volt/Var Control for Smart Grid Solutions", Jun. 9, 2011, pp. 1-4.*

Vukojevic et al, "Integrated Volt/Var Control Using Single-Phase Capacitor Bank Switching", 2013, pp. 7.*

International Search Report issued in connection with PCT/US2012/045539, Dec. 3, 2012.

International Search Report, Application No. PCT/US2012/045539, dated Dec. 3, 2012, pp. 10.

* cited by examiner

FIG. 6

| Device | DS #1 | DS #2 | DS #3 | TS #1 | TS #2 | TS #3 | TS #4 |
|---|---|---|---|---|---|---|---|
| Status | 1 | 1 | 0 | 0 | 0 | 0 | 0 |

| Capacitor | State | Size [kVAR] | Capacitor Counter | Timer [s] ON→OFF | Timer [s] OFF→ON | Status |
|---|---|---|---|---|---|---|
| $C_1$ | ON | 900 | 1 | 7200 | 5400 | AVAILABLE |
| $C_2$ | OFF | 1200 | 4 | 7200 | 5400 | UNAVAILABLE |
| $C_3$ | ON | 600 | 3 | 7200 | 5400 | AVAILABLE |
| $C_4$ | ON | 1800 | 5 | 7200 | 5400 | AVAILABLE |
| $C_5$ | OFF | 1800 | 5 | 7200 | 5400 | OTS |

Feeder Table (500)

| Feeder | $C_1$ | $C_2$ | $C_3$ | $C_4$ | $C_5$ |
|---|---|---|---|---|---|
| $F_1$ | 1 | 0 | 0 | | |
| $F_4$ | 0 | 1 | 1 | 0 | |
| $F_2$ | 1 | 0 | 0 | 1 | 0 |
| $F_3$ | | | | | |

FIG. 11

Substation Table (510)

| Feeder | $C_1$ | $C_2$ | $C_3$ | $C_4$ | $C_5$ |
|---|---|---|---|---|---|
| $F_1$ | 0 | 0 | 0 | | |
| $F_4$ | 0 | 0 | 1 | 0 | |
| $F_2$ | 1 | 0 | 0 | 0 | 0 |
| $F_3$ | | | | | |

FIG. 12

Final Table (520)

| Feeder | $C_1$ | $C_2$ | $C_3$ | $C_4$ | $C_5$ |
|---|---|---|---|---|---|
| $F_1$ | $1\cap0=0$ | $0\cap0=0$ | $0\cap0=0$ | | |
| $F_4$ | $0\cap0=0$ | $1\cap0=0$ | $1\cap1=1$ | $0\cap0=0$ | |
| $F_2$ | $1\cap1=1$ | $0\cap0=0$ | $0\cap0=0$ | $1\cap0=0$ | $0\cap0=0$ |
| $F_3$ | | | | | |

APPARATUS FOR DECENTRALIZED COORDINATED VOLT/VAR CONTROL (CVVC)

BACKGROUND OF THE INVENTION

The embodiments described herein relate generally to electric distribution systems and, more particularly, to apparatus for enhancing control of voltage and power factor within electric distribution systems.

Known electric power grids typically include power generation plants, transmission and distribution lines, transformers, and other devices that facilitate electric power transmission, and power delivery. After electric power is generated in the generating plants, it is transmitted for extended distances through the high voltage transmission lines to subtransmission/distribution substations. Transmission lines usually operate at voltage levels between approximately 115 kilovolts (kV) and approximately 765 kV. At the subtransmission/distribution substations, transformers reduce the high voltage at which the power has been transmitted to sub-transmission voltage levels that range from approximately 46 kV to approximately 69 kV, or to distribution voltage levels that range from approximately 12 kV to approximately 34.5 kV. Power is then transmitted through a feeder to an end customer through an electric distribution system, and before it reaches the end customer, the voltage is decreased to approximately 120V/240V by a distribution transformer.

Most known electric distribution systems include a plurality of feeders coupled to the substation transformer. Each feeder includes a plurality of distribution transformers. The feeder may also include at least one capacitor bank, at least one voltage regulator, and at least one distributed generation device, e.g., a diesel generator. A plurality of typically open tie switches, each adjacent to a neighboring substation, define the outer boundaries of the feeder. The feeder is divided into smaller units via disconnect switches, reclosers, sectionalizers, and fuses.

In some known feeders, the voltage decreases between the head of the feeder and the end of line (EOL) customers. Therefore, to maintain voltage within predetermined parameters during peak electric loading periods, including those regions most remote from the feeder head, the power generation plants raise generated voltage and/or adjust the power factor. Alternatively, or in addition to the actions of the generation plants, localized distributed generation devices may be started. These actions require combusting additional fuel resources and increasing the costs of operation, thereby decreasing system efficiency merely to support localized voltage levels and power factors. In other known feeders, local capacitor banks are used to support local voltages. However, such local voltage regulation may require multiple, unnecessary switching to bring the capacitor banks on-line and take them off-line in relatively short time frames. Moreover, such local voltage regulation may not adequately control other operating parameters within the feeders, such as active power losses across the sections from head of the feeders to the EOL customers.

BRIEF DESCRIPTION OF THE INVENTION

In one aspect, a system for enhancing decentralized coordinated Volt/Var control (CVVC) is provided. The system includes a memory device configured to store a plurality of operational measurements of an electric distribution system. The electric distribution system includes a plurality of capacitive devices. The system also includes a processor coupled in communication with the memory device. The processor is programmed to determine a plurality of potential configurations for the plurality of capacitive devices. The processor is also programmed to determine a priority of switching of each of the plurality of capacitive devices as a function of at least one of at least one actual voltage measurement of the electric distribution system, at least one power factor determination of the electric distribution system, at least one voltage parameter, at least one power factor parameter, and an availability of each of the capacitive devices.

In another aspect, a system for enhancing decentralized coordinated Volt/Var control (CVVC) is provided. The system includes a memory device configured to store a plurality of operational measurements of an electric distribution system. The electric distribution system includes at least one feeder that includes a plurality of capacitive devices. The system also includes a processor coupled in communication with the memory device. The processor programmed to determine an actual power factor for the at least one feeder and determine if the actual power factor for the at least one feeder is within predetermined feeder power factor parameters. The processor is also programmed to determine a priority of each capacitive device available for switching from the plurality of capacitive devices as a function of a voltage flattening effect on the feeder. The processor is further programmed to determine a range between predetermined feeder reactive power parameters. The processor is also programmed to determine a range of differential reactive power values between actual reactive power on the at least one feeder and a target value for reactive power on the at least one feeder. The processor is further programmed to determine a differential reactive power value for each available capacitive device and command at least available capacitive device to switch.

In yet another aspect, a system for enhancing decentralized coordinated Volt/Var control (CVVC) is provided. The system includes a memory device configured to store a plurality of operational measurements of an electric distribution system. The electric distribution system includes a substation, a transformer, and a plurality of feeders coupled to the transformer. The electric distribution system also includes a plurality of capacitive devices in each feeder. The system also includes a processor coupled in communication with the memory device. The processor is programmed to determine an actual power factor for a low side of the transformer and an actual power factor for each feeder of the plurality of feeders. The processor is also programmed to determine if the actual power factor for the low side of the transformer is within predetermined transformer low side power factor parameters. The processor is further programmed to determine a forecasted power factor for each of the plurality of feeders as a function of a status and an availability of the capacitive devices in each feeder. The processor is also programmed to determine if each of the actual power factors for each feeder of the plurality of feeders and the forecasted power factors for each feeder of the plurality of feeders are within predetermined feeder power factor parameters. The processor is further programmed to determine a forecasted power factor for the low side of the transformer as a function of the status and the availability of the capacitive devices in each feeder. The processor is also programmed to determine if each of the actual power factor for the low side of the transformer and the forecasted power factors for the low side of the transformer are within predetermined transformer low side power factor parameters. The processor is further programmed to determine a switching priority for each of the plurality capacitive devices as a function of a comparison between the power factors determined for the plurality of feeders and the power factors determined for the low side of the transformer.

BRIEF DESCRIPTION OF THE DRAWINGS

FIG. 6 is a tabular view of a status for some of the devices used in the feeder shown in FIG. 3;

FIG. 7 is a tabular view of a capacitor bank status for a plurality of capacitor banks used in the feeder shown in FIG. 3;

FIG. 10 is a tabular view of capacitive device suitability at the feeder level;

FIG. 11 is a tabular view of capacitive device suitability at the substation level;

FIG. 12 is a tabular view of capacitive device suitability at both the feeder level and the substation level;

DETAILED DESCRIPTION OF THE INVENTION

Figure 1:
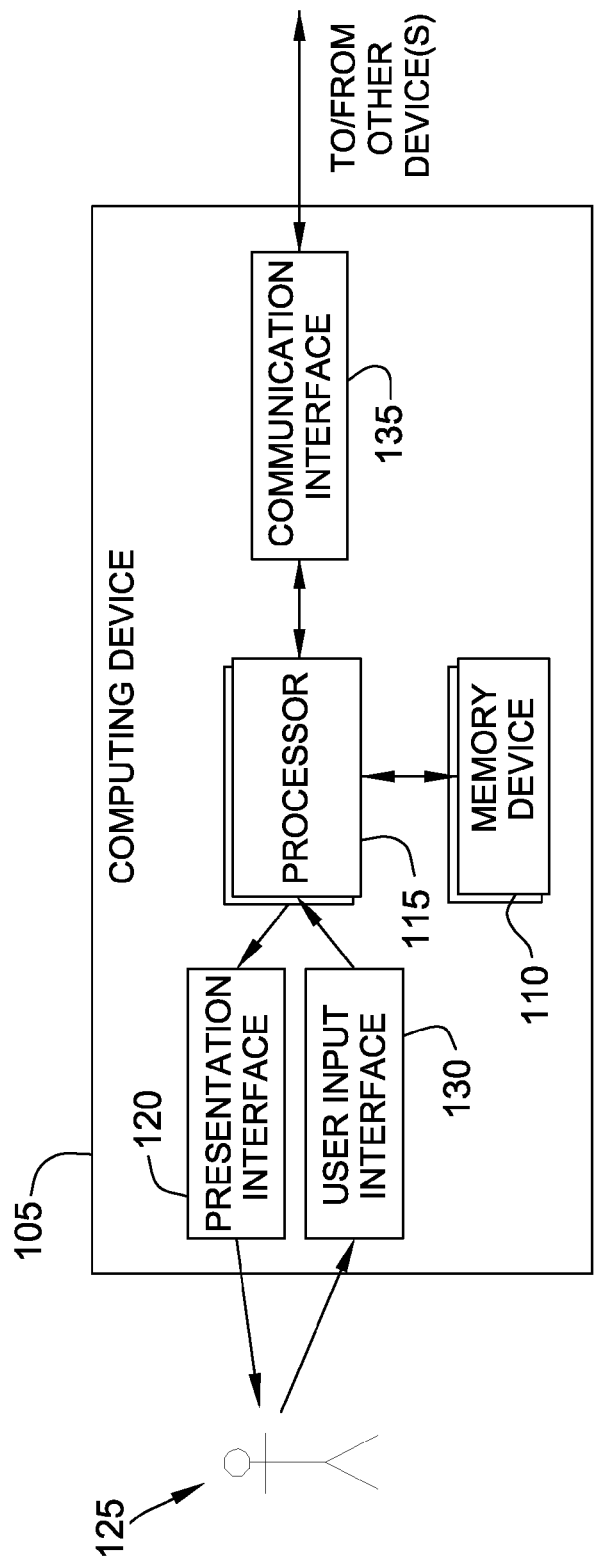
FIG. 1 is a block diagram of an exemplary computing device that may be used to monitor and/or control the operation of a portion of an electric distribution system.

FIG. 1 is a block diagram of an exemplary computing device 105 that may be used to monitor and/or control the operation of a portion of an electric distribution system (not shown in FIG. 1). Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

In the exemplary embodiment, memory device 110 is one or more devices that enable storage and retrieval of information such as executable instructions and/or other data. Memory device 110 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Further, as used herein, the terms "software" and "firmware" are interchangeable, and include any computer program stored in memory for execution by personal computers, workstations, clients and servers.

Memory device 110 may be configured to store operational measurements including, without limitation, substation voltage and current readings, localized voltage and current readings throughout an electric distribution system (not shown in FIG. 1), and/or any other type of data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate decentralized coordinated Volt/Var control (CVVC) (discussed further below).

In some embodiments, computing device 105 includes a presentation interface 120 coupled to processor 115. Presentation interface 120 presents information, such as a user interface and/or an alarm, to a user 125. For example, presentation interface 120 may include a display adapter (not shown) that may be coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 may include an audio output device (not shown) (e.g., an audio adapter and/or a speaker) and/or a printer (not shown). In some embodiments, presentation interface 120 presents an alarm associated with a synchronous machine (not shown in FIG. 1), such as by using a human machine interface (HMI) (not shown).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
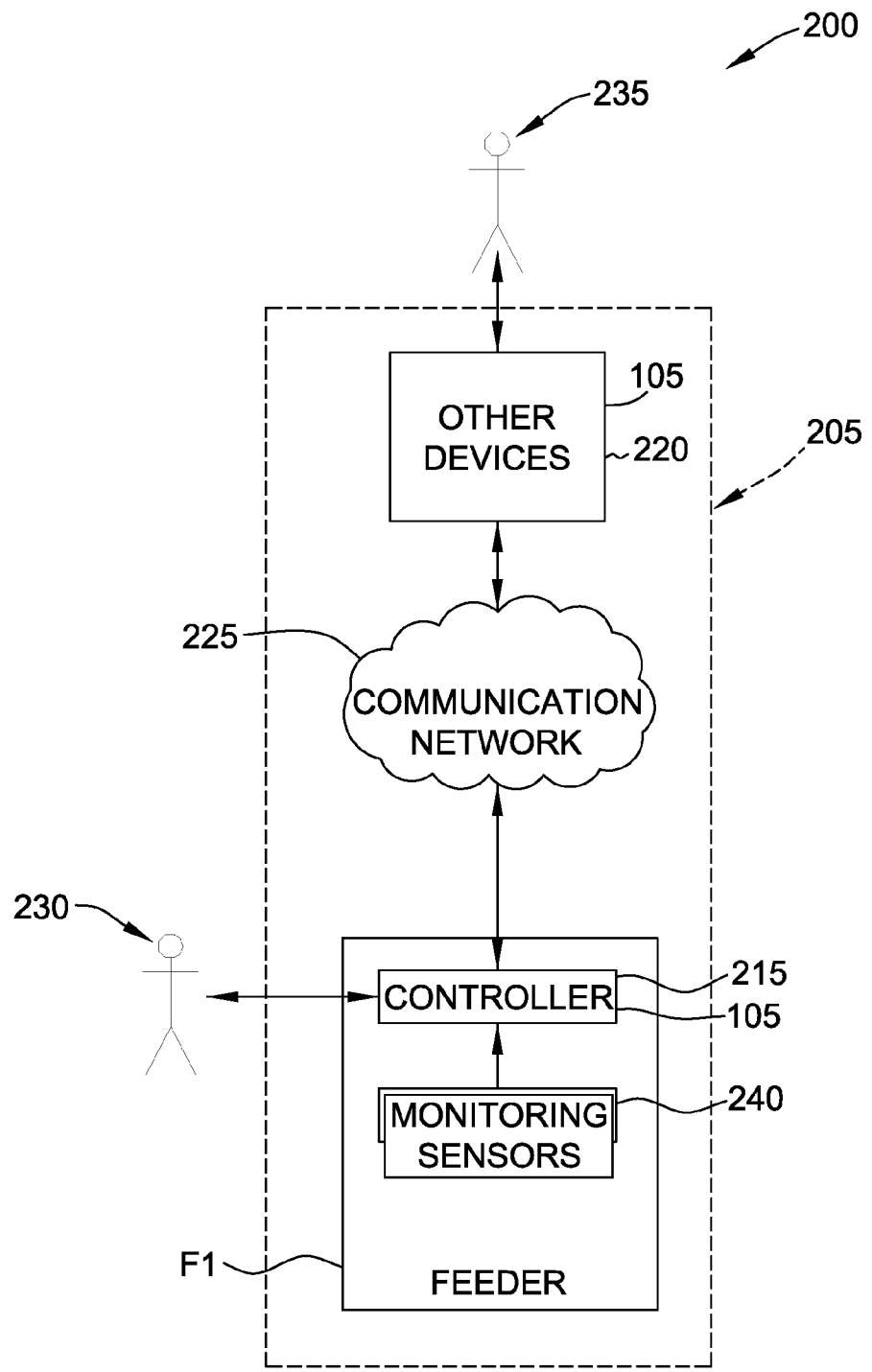
FIG. 2 is block diagram of an exemplary electric distribution monitoring and control system that includes an electric distribution system controller.

FIG. 2 is block diagram of an exemplary monitoring and control system 200 that may be used to monitor and/or operate a portion of an electric distribution system 205, e.g., an electric distribution section, or feeder F1. System 200 includes an electric distribution system, or feeder controller 215 that may be coupled to other devices 220 via a communication network 225. Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, controller 215 may perform all of the operations below.

Referring to FIGS. 1 and 2, controller 215 is a computing device 105. In the exemplary embodiment, computing device 105 is coupled to network 225 via communication interface 135. In an alternative embodiment, controller 215 is integrated with other devices 220.

Controller 215 interacts with a first operator 230 (e.g., via user input interface 130 and/or presentation interface 120). For example, controller 215 may present information about electric distribution system 205 and feeder F1, such as alarms, to operator 230. Other devices 220 interact with a second operator 235 (e.g., via user input interface 130 and/or presentation interface 120). For example, other devices 220 may present alarms and/or other operational information to second operator 235. As used herein, the term "operator" includes any person in any capacity associated with operating and maintaining electric distribution system 205 and feeder F1, including, without limitation, shift operations personnel, maintenance technicians, and system supervisors.

Feeder F1 includes one or more monitoring sensors 240. In exemplary embodiments, monitoring sensors 240 collect operational measurements including, without limitation, substation voltage and current readings, localized voltage and current readings throughout an electric distribution system, and/or any other type of data. Monitoring sensors 240 repeatedly (e.g., periodically, continuously, and/or upon request) transmit operational measurement readings at the current time. For example, monitoring sensors 240 may produce an electrical current between a minimum value (e.g., 4 milliamps (mA)) and a maximum value (e.g., 20 mA). The minimum sensor current value is representative of an indication that a minimum measure condition value is detected. The maximum current value is representative of an indication that the highest detectable condition value is detected. Controller 215 receives and processes the operational measurement readings. Also, controller 215 includes, without limitation, sufficient data, algorithms, and commands to facilitate decentralized coordinated Volt/Var control (CVVC) (discussed further below).

In the exemplary embodiment, electric distribution system 205 includes additional monitoring sensors (not shown) similar to monitoring sensors 240 that collect operational data measurements associated with the remainder of electric distribution system 205 including, without limitation, data from additional feeders and environmental data, including, without limitation, local outside temperatures. Such data is transmitted across network 225 and may be accessed by any device capable of accessing network 225 including, without limitation, desktop computers, laptop computers, and personal digital assistants (PDAs) (neither shown).

Topology Identification Algorithms and Methods

Figure 3:
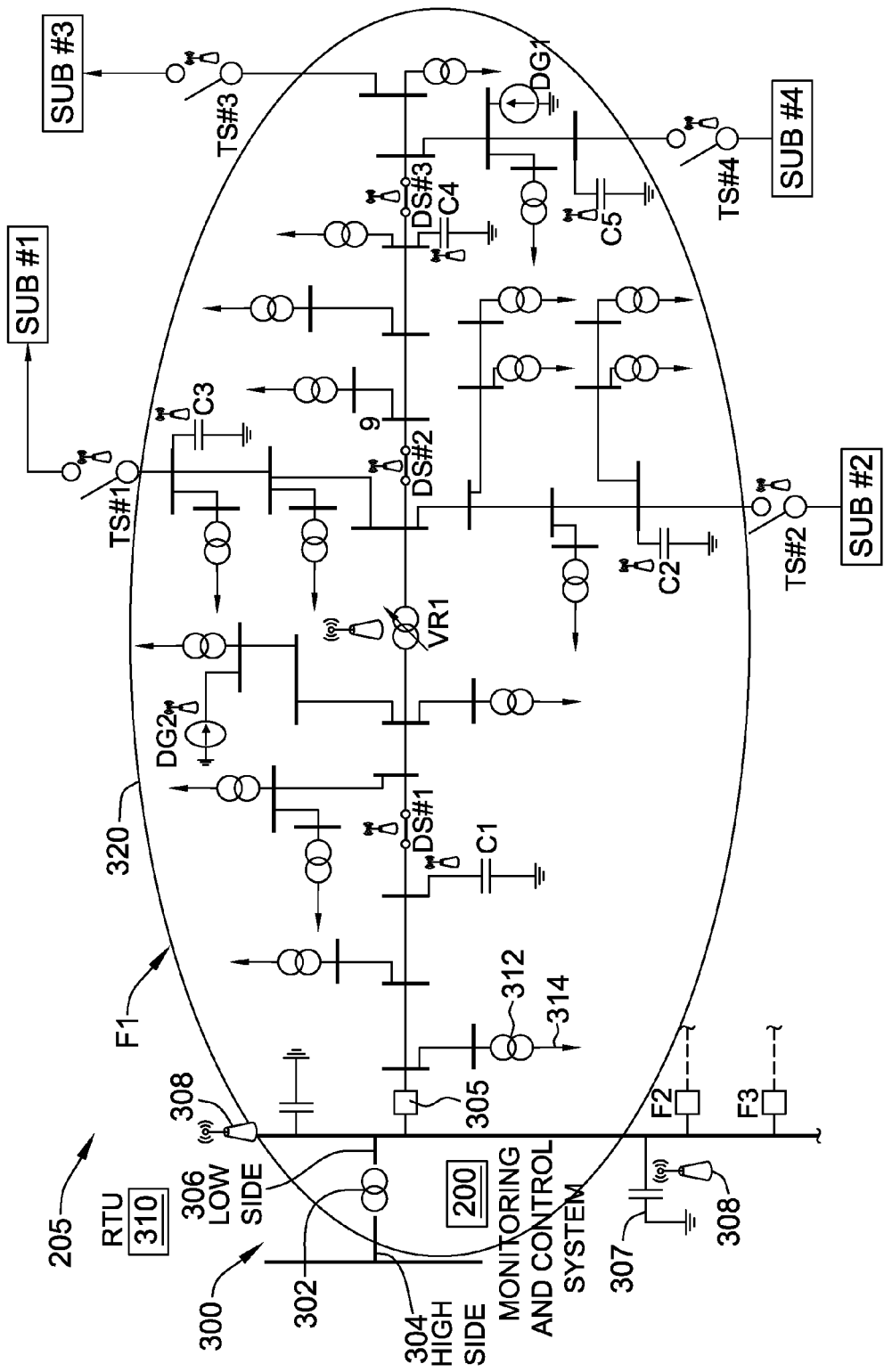
FIG. 3 is a schematic diagram of an exemplary electric distribution system and one feeder thereof.

FIG. 3 is a schematic diagram of exemplary electric distribution system 205 and one feeder F1 thereof Electric distribution system 205 includes a substation 300. Substation 300 includes a step-down substation transformer 302 that defines a high side bus 304 and a low side bus 306. In the exemplary embodiment, transformer 302 is a load tap changing (LTC) transformer. Alternatively, transformer 302 is any type of transformer that enables operation of feeder F1 as described herein. Transformer 302 transforms high side 304 voltage to a low side 306 voltage within a defined range. Electric distribution system 205 includes a plurality of electric distribution sections, or feeders F1, F2, and F3, discussed further below. Substation 300 may also include at least one optional substation capacitive device 307.

In the exemplary embodiment, a feeder F1 is coupled to transformer 302. Feeder F1 includes at least one circuit breaker 305 that facilitates coupling and isolating transformer 302 and feeder F1. Feeders F2 and F3 show how additional, similar feeders are coupled to transformer 302. Monitoring and control system 200 includes sufficient computing resources and programming to facilitate operation of decentralized coordinated Volt/Var control (CVVC) (discussed further below) at a substation level and/or a feeder level. System 200 is coupled in communication with equipment within substation 300 and feeder F1 via a plurality of communication devices 308 (only two labeled) that may define a portion of communication network 225 (shown in FIG. 2). Communication network 225 may also include a remote communications device, e.g., a remote terminal unit (RTU) 310 that facilitates remote communication between system 200 and communication devices 308.

Feeder F1 also includes a plurality of capacitor banks, or capacitors $C_1$, $C_2$, $C_3$, $C_4$, and $C_5$. Hereon, the term "C," refers to each, and any, of capacitors $C_1$ through $C_5$, wherein "i" is any numeral from 1 to 5. When a capacitor $C_i$ is on (e.g., closed), some amount of reactive power (VAR) will be injected into feeder F1 through associated capacitor(s) C. By varying which capacitors $C_i$ are switched on or off, the amount of reactive power may vary. Consequently, other operational conditions of feeder F1, such as power factor, active power losses, and voltage deviation within feeder F1, may vary.

Feeder F1 further includes a plurality of distribution transformers 312 (only one labeled) coupled to feeder F1. Feeder F1 also includes a plurality of electric loads 314 (only one labeled) coupled to each of distribution transformers 312. Feeder F1 may include at least one voltage regulator (only one, i.e., VR1, shown in FIG. 3) coupled to feeder F1. Alternatively, some embodiments of feeder F1 may include a plurality of cascaded voltage regulators. In the exemplary embodiment, voltage regulator VR1 operates in conjunction with LTC transformer 302. Alternatively, for those embodiments that do not have a LTC associated with transformer 302, voltage regulator VR1 facilitates voltage control within feeder F1. Also, alternatively, for those embodiments that do not have a voltage regulator on the associated feeder, the LTC within transformer 312 facilitates voltage control within feeder F1. As the voltage across feeder F1 increases or decreases, LTC transformer 302 and/or voltage regulator VR1 regulate the voltages within feeder F1 to facilitate maintaining such voltages within the defined range, e.g., between 114V and 126V.

LTC transformer 302 and/or voltage regulator VR1 each may include selectable tap positions that can be changed and controlled via monitoring and control system 200. Changing the tap position within LTC transformer 302 changes the voltage on all feeders at the same time in discrete steps. Changing the tap position within the voltage regulators changes the voltage only in the associated feeder. These different tap positions may cause voltage regulator VR1 to increase or decrease the voltage on low side 306 to a predetermined value. Each LTC and VR includes a controller (not shown) that generates a countdown prior to a tap changing event.

Feeder F1 also includes a plurality of distributed generation devices, i.e., DG1 and DG2 that may be used to inject power into feeder F1. DG1 and DG2 are any type of distributed generation devices, including, without limitation, diesel generators, micro-turbines, and solar collector arrays. Feeder F1 further includes a plurality of disconnect switches DS1, DS2, and DS3 that facilitate coupling of, and isolation of, portions of feeder F1.

Also, in the exemplary embodiment, feeder F1 may be coupled to other substations, e.g., sub #1, via a tie switch TS #1. Sub #s 1, 2, 3, and 4 and associated tie switch TS #s 1, 2, 3, and 4, respectively, are shown in FIG. 3. TS #s 1, 2, 3, and 4 are normally open. Moreover, TS #s 1 through 4, in cooperation with transformer 302, facilitate defining the geographical and operational scope of a decentralized CVVC portion 320 of monitoring and control system 200 associated with feeder F1. TS #s 1, 2, 3, and 4, in cooperation with the "last", i.e., most distant, customer metering downstream of the most distant distribution transformer 312, define end-of-line (EOL) voltage value. Specifically, the most distant metering from transformer 302 defines EOL voltage. CVVC portion 320 facilitates maintaining EOL voltage within specification while facilitating voltage flattening within feeder F1.

Monitoring and control system 200 includes at least one topology identification algorithm that facilitates identifying the status of disconnect switches DS1, DS2, and DS3, reclosers (none shown), and TS #s 1, 2, 3, and 4 associated with feeder F1. Therefore, system 200 "knows" at all times which capacitors $C_i$ are available for switching.

Figure 4:
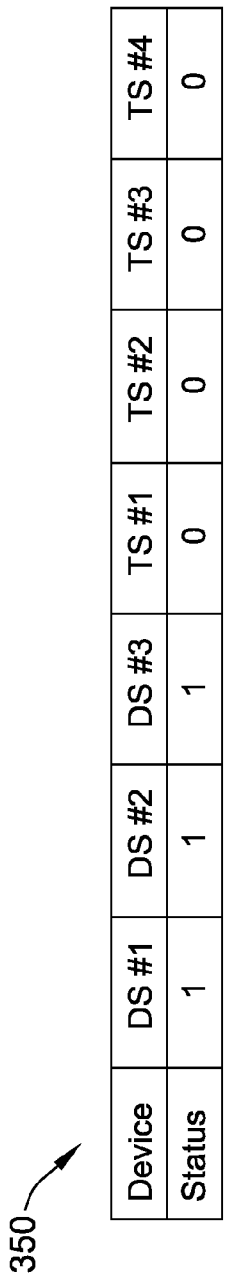
FIG. 4 is a tabular view of a status for some of the devices used in the feeder shown in FIG. 3.

FIG. 4 is a tabular view, i.e., a table 350, of a status for some of the devices used in feeder F1 (shown in FIG. 3). Specifically, table 350 shows a discrete status of devices DS1, DS2, DS3, TS #1, TS #2, TS #3, and TS #4 as "closed" with a "1" and "open" with a "0". Here, the three DSs are closed and the four TSs are open.

Figure 5:
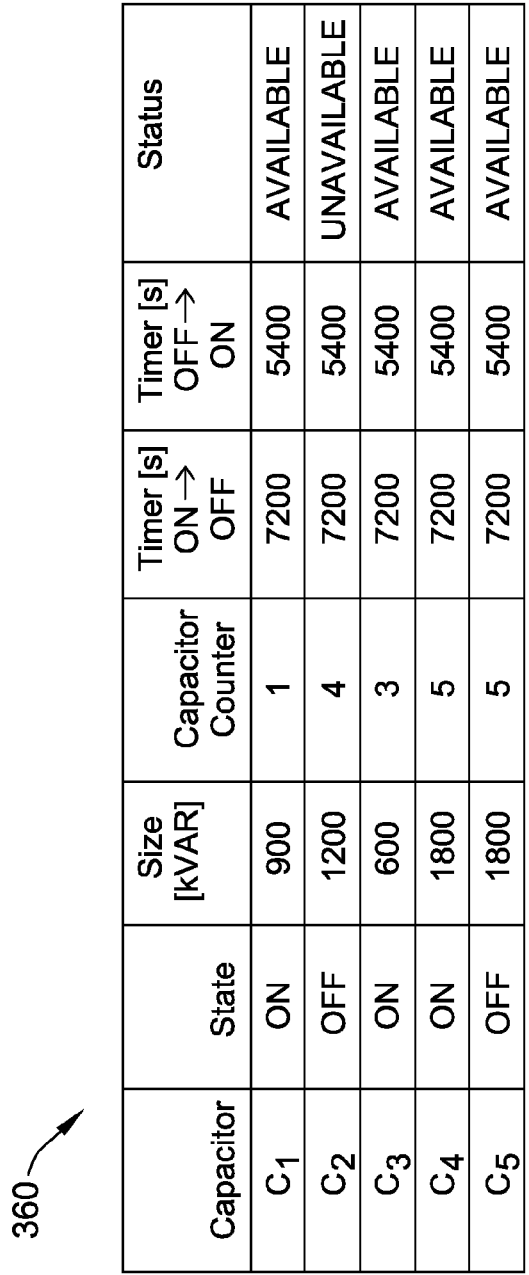
FIG. 5 is a tabular view of a capacitor bank status for a plurality of capacitor banks used in the feeder shown in FIG. 3.

FIG. 5 is a tabular view, i.e., a table 360, of a capacitor bank $C_i$ status for a plurality of capacitor banks $C_i$ used in feeder F1 (shown in FIG. 3). Specifically, table 360 shows each capacitor $C_i$ including a state ("ON" or "OFF"), the size (in kVAR), a counter (number of times operated), a timer setting for ON to OFF switches, a timer setting for OFF to ON switches, and status ("AVAILABLE" or "UNAVAILABLE"). The counter tracks capacitor operations to facilitate reducing unnecessary switching operations by placing a limit on the number of switching operations, as an option. Each capacitor $C_i$ includes a controller (not shown) that tracks the time since the last operation and prevents subsequent operation for a predetermined period of time. A capacitor $C_i$ is available when all of the requirements for operating are met, for example, without limitation, no maintenance is ongoing and no associated timers are preventing operation. For example, table 360 shows capacitor $C_2$ as unavailable due to maintenance.

FIG. 6 is a tabular view, i.e., a table 370, of a status for some of the devices used in feeder F1 (shown in FIG. 3). Specifically, table 370 shows a discrete status of devices DS1, DS2, DS3, TS #1, TS #2, TS #3, and TS #4 as "closed" with a "1" and "open" with a "0". Here, the DS1 and DS2 are closed and DS3 is open, while the four TSs are open. Referring to FIG. 3, when DS3 is open, capacitor $C_5$ is not available for service/operation.

FIG. 7 is a tabular view. i.e., a table 380, of the capacitor bank status for a plurality of capacitor banks C, used in feeder F1 (shown in FIG. 3). Here, due to opening DS3 as described for FIG. 6, capacitor $C_5$ is not available for service/operation and receives a status of "OTS", i.e., outside of service territory. Such OTS status excludes capacitor $C_5$ from control by system 200.

Figure 8:
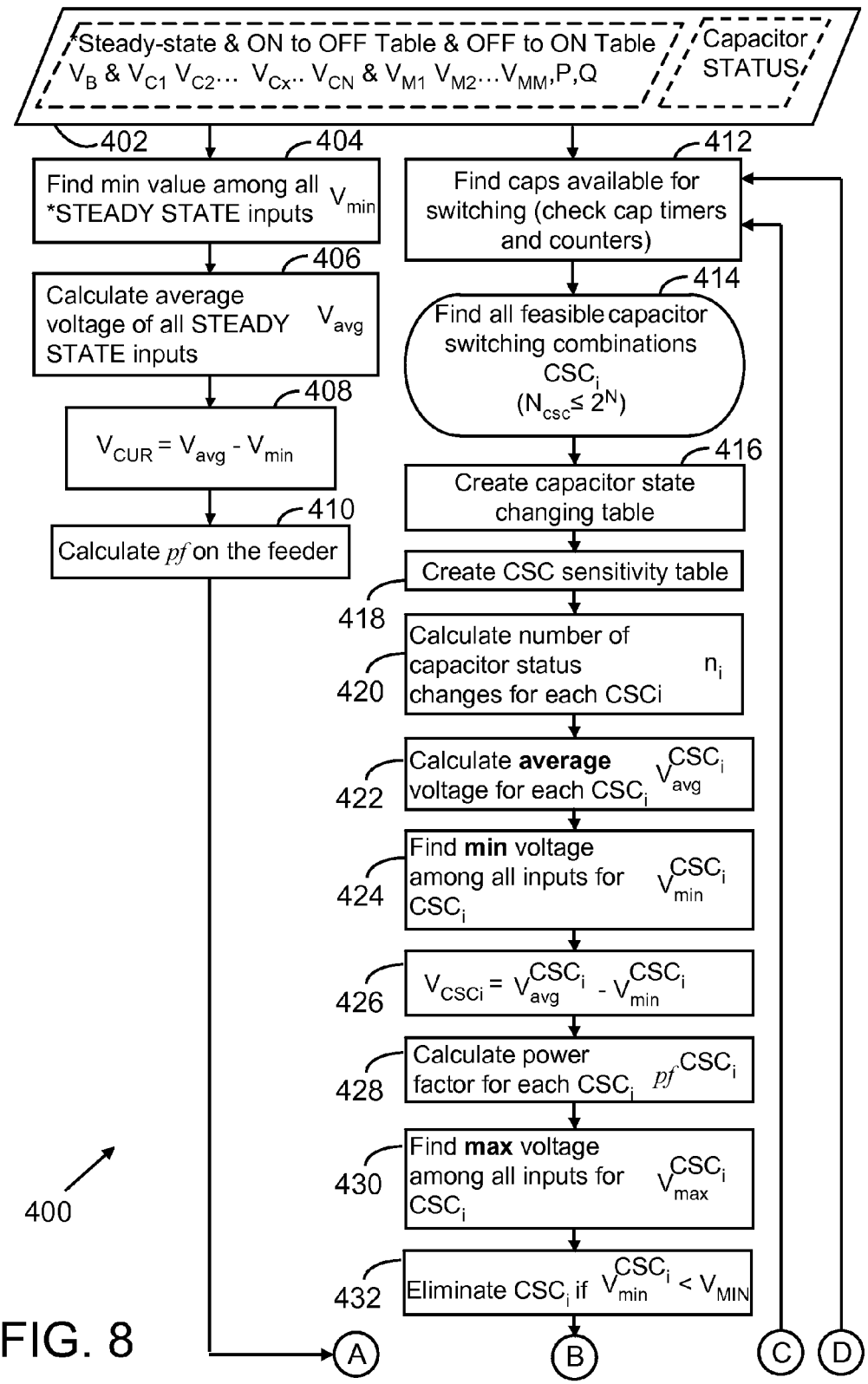
FIG. 8 is a flow chart of an exemplary method of flattening the voltage and enhancing the power factor of the feeder shown in FIG. 3.
Figure 9:
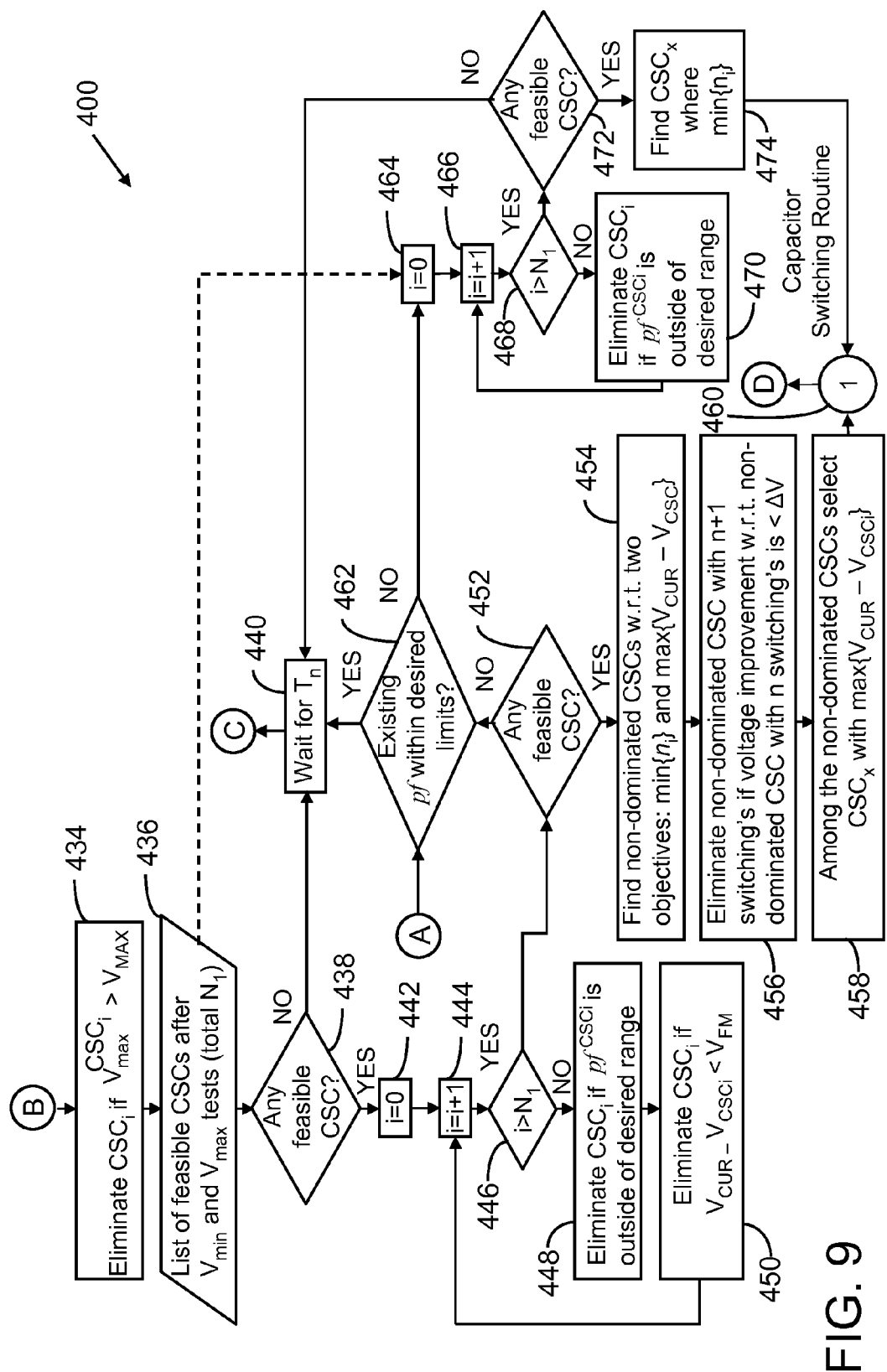
FIG. 9 is a continuation of FIG. 8.

Combined Voltage Flattening and Power Factor Determination and Control Algorithms and Methods FIG. 8 is a flow chart of an exemplary method 400 of flattening the voltage and enhancing the power factor of feeder F1 (shown in FIG. 3). FIG. 9 is a continuation of FIG. 8. The flattest voltage profile is defined as the profile with the smallest difference between the average voltage and the lowest voltage on the feeder, considering all voltage measurement points. However, in some alternative embodiments, a different method of determining voltage profile flatness may be used. Monitoring and control system 200 (shown in FIG. 2) includes at least one voltage flattening algorithm and power factor correction algorithm that cooperate to facilitate power factor correction at feeder F1 level while incorporating voltage flattening features within feeder F1 via capacitor $C_i$ control functions thereof. Monitoring and control system 200 is scalable to facilitate inclusion of all feeders F1, F2, and F3 associated with electric distribution system 205 (shown in FIG. 3). Therefore, the power factor is maintained within predetermined parameters at all feeders F1, F2, and F3 originating from substation 300 (shown in FIG. 3), thereby facilitating controlling the power factor within predetermined parameters at the substation level, i.e., at low side 306 (shown in FIG. 3).

In the exemplary embodiment, the voltage flattening algorithms and the power factor correction algorithms programmed within monitoring and control system 200 are based on real-time, i.e., actual telemetry measurements of conditions within feeder F1 collected and transmitted by monitoring sensors 240 (shown in FIG. 2). Specifically, monitoring and control system 200 evaluates all capacitor $C_i$ switching combinations (CSCs) with respect to present capacitor $C_i$ status and availability, predetermined voltage limits, predetermined power factor limits, and telemetry-based measurements of feeder F1. Among all feasible CSCs, the algorithms facilitate selecting a particular $CSC_x$ that will flatten the voltage profile most and keep the power factor within specified limits. Capacitors $C_i$ are switched one at the time.

As used herein, the term "$VC_i$" represents a variable for the voltage measured at a capacitor bank i, that is C. Also, as used herein, the term "$VM_i$" represents a variable for the voltage measured at another metering point i within feeder F1. Further, as used herein, the term "VB" represents a variable for the voltage measured at low side 306. Moreover, as used herein, the term "$V_{MAX}$" represents a variable for the maximum allowable voltage, e.g., 126V. Also, as used herein, the term "$V_{MIN}$" represents a variable for the minimum allowable voltage, e.g., 114V. Further, as used herein, the term "$V_{FM}$" represents a variable for the voltage flattening margin, which represents a minimum required improvement in the voltage profile within feeder F1 before any capacitor $C_i$ is switched. The $V_{FM}$ is a configurable parameter, for example, without limitation, about 0.2V. Moreover, as used herein, the term "ΔV" represents a variable for the voltage flattening improvement margin, which further represents a minimum required improvement in the voltage profile within feeder F1 to justify an increase in the number of capacitor switchings. The ΔV is a configurable parameter, for example, without limitation, about 0.2V. Also, as used herein, the term "$T_N$" represents a variable for the time delay between two temporally adjacent capacitor control actions. Further, as used herein, the term "P" and the term "Q" represent variables for real power and reactive power, respectively.

Also, in the exemplary embodiment, algorithm inputs include, without limitation, as they are defined above, VB measurement, P and Q feeder F1 measurements, all $VC_i$ measurements, and all $VM_i$ measurements. Further, in the exemplary embodiment, algorithm inputs include a predetermined, configurable power factor range. Moreover, in the exemplary embodiment, algorithm inputs include, without limitation, at least one capacitor switching sensitivity table (not shown).

Each capacitor sensitivity table includes a plurality of rows, wherein each row, i, corresponds to a feasible $CSC_i$. Each capacitor sensitivity table also includes a plurality of columns that correspond to measurement points, i.e., capacitor bank $C_i$ locations and other measurement points. Each capacitor sensitivity table also includes a plurality of columns that correspond to values that represent voltage changes due to capacitor $C_i$ switching for the particular $CSC_i$. Each time a capacitor bank $C_i$ is switched, voltage readings at each measurement point are taken and subtracted from the base voltage to determine a change is voltage due to the associated switching event. These values are calculated using the status and availability tables of each capacitor $C_i$ as described above for FIGS. 5 and 7 by adding voltage sensitivity values when changing capacitor status from "OFF" to "ON" and subtracting voltage sensitivity values when changing capacitor status from "ON" to "OFF".

In the exemplary embodiment, method 400 includes transmitting 402 the above inputs into monitoring and control system 200. Specifically, VB measurement, P and Q feeder F1 measurements at low side 306, all VC, measurements, and all $VM_i$ measurements are input to monitoring and control system 200. Such measurements are steady-state measurements, i.e., the measurements are taken during non-transient, i.e., steady-state conditions on feeder F1. Some embodiments of monitoring and control system 200 may include at least one voltage measurement integrity test algorithm that may be used to determine if the incoming voltage measurements, i.e., the VB, VC, and $VM_i$ measurements are within expected ranges. Such expected ranges for the incoming voltage measurements are configurable. Voltage measurements within the associated ranges are allowed to be used and voltage measurements outside of the associated ranges are not allowed to be used.

A minimum voltage value, i.e., a $V_{min}$, for each of the voltage measurements is determined 404 from the incoming data. Also, an average voltage value, i.e., a $V_{avg}$, for each of the voltage measurements is determined 406 from the incoming data. A current voltage value, i.e., a $V_{CUR}$, for each of the voltage measurements is determined 408 by subtracting the associated value for $V_{min}$ from the associated value for $V_{avg}$. A value for the power factor (pf) at low side 306 is determined 410 from the values of P and Q received using the equation:

$$pf=P/\sqrt{[P^2+Q^2]} \qquad (Eq. 1)$$

wherein, the pf value will be used as discussed below.

Each capacitor bank C, that is available for switching is determined 412. As used herein, the term "M" refers to the total number of available capacitor banks C, wherein M≤N, and N is the total number of installed capacitor banks $C_i$ within feeder F1.

The potential capacitor switching combinations ($CSC_i$) using only available capacitors $C_i$ are determined 414. There will be a total of $2^M$ combinations, wherein M is the total number of available capacitors $C_1$. A capacitor status changing table (not shown) for all CSCs is created 416 based on the current capacitor switching statuses and $CSC_i$. This table will have $2^M$ rows (one row for each $CSC_i$) and M columns (one column for each capacitor $C_i$). A new capacitor switching sensitivity table (not shown) is generated 418 based on the existing capacitor switching sensitivity tables (ON-to-OFF and OFF-to-ON) and the CSC, status changing table by adding sensitivity values when changing capacitor status from "OFF" to "ON" and subtracting voltage sensitivity values when changing capacitor status from "ON" to "OFF". Capacitor status changes, e.g., a new voltage profile for each $CSC_i$ throughout feeder F1 is calculated 420 based on available voltage measurements and the updated capacitor switching sensitivity table.

An average voltage value, i.e., a $V_{avg}^{CSCi}$ for each $CSC_i$ is determined 422 from the incoming data. A minimum voltage value, i.e., a $V_{min}^{CSCi}$ for each $CSC_i$ is determined 424 from the incoming data. A current voltage value, i.e., a $V_{CSCi}$, for each $CSC_i$ is determined 426 by subtracting the associated value for $V_{min}^{CSCi}$ from the associated value for $V_{avg}^{CSCi}$. An updated pf value for each of $CSC_i$ is calculated 428 at low side 306 using the equation:

$$pf^{CSCi}=P/\sqrt{[P^2+(Q+\Sigma k_i {}^* Q_{ONi})^2]}, \qquad (Eq. 2)$$

wherein where $k_i$ is a configurable user preference, $Q_{OFF\ and\ QON}$ correspond to rated kVARs of the capacitors $C_i$ in each $CSC_i$ as a function of changing their status from ON to OFF and from ON to OFF, respectively.

A maximum voltage value, i.e., a $V_{max}^{CSCi}$ for each $CSC_i$ is determined 430 from the incoming data. A $CSC_i$ is eliminated 432 from consideration if $V_{min}^{CSCi} < V_{MIN}$ (as defined above). Also, a CSC, is eliminated 434 from consideration if $V_{max}^{CSCi} > V_{MAX}$ (as defined above). A list of feasible CSCs are created 436. wherein the total number of feasible CSCs is $N_1$. A discrete determination is made 438 if there are, or are not, feasible CSCs left after steps 432 and 434. If there are no feasible CSCs left, a temporal latency of $T_N$ (a configurable user preference) is applied 440 and the process returns to method step 412. If there are feasible CSCs, an iterative function is executed starting with setting 442 to a value of "0". The value of i is increased 444 by "1". A discrete determination is made 446 if $i > N_1$, or not. If not, each $CSC_i$ wherein $pf^{CSCi}$ is outside of a predetermined range is eliminated 448. Also, each $CSC_i$ wherein $V_{CUR} - V_{CSCi} < V_{FM}$ (a configurable user preference as defined above) is eliminated 450. Method steps 446 through 450 are iterated until the discrete determination if $i > N_1$ is met, i.e., there are no further CSCs to evaluate.

If there are remaining CSCs wherein $i > N_1$, a discrete determination is made 452 if any feasible CSCs remain. If there are, non-dominated CSCs are located 454 if two requirements are met for the associated CSCs, i.e., a Min $\{n_i\}$ determination is made and a Max $\{V_{CUR} - V_{CSCi}\}$ determination is made, wherein $n_i$ is a number of capacitor status changes in $CSC_i$.

As used herein, the term "non-dominated" identifies a solution for nontrivial multiobjective problems for those circumstances where one cannot identify a single solution that simultaneously optimizes each objective. While searching for solutions, one reaches points such that, when attempting to improve an objective further, other objectives suffer as a result. A tentative solution is referred to as "non-dominated" if it cannot be eliminated from consideration by replacing it with another solution which improves an objective without worsening another one. For example, for a multiobjective problem having "k" objective functions to be simultaneously optimized, a solution "x" is said to dominate the solution "y" if "x" is better than "y" for at least one objective and not worse for any other objective. A solution that is not dominated by any other solution is called a non-dominated solution. In the case of two objectives, a solution "x" is said to be dominated by the solution "y" if "x" is better than "y" with respect to one objective and it is not worse for the other objective. A solution that is not dominated by any other solution is called a non-dominated solution.

The non-dominated CSC solutions are sorted in an ascending order with respect to $n_i$ and the non-dominated CSC solutions with more capacitor status changes that do not perform significantly better than CSC solutions with less capacitor status changes in terms of voltage improvement are eliminated, i.e., a non-dominated CSC with n+1 switchings if the voltage improvement with respect to a non-dominated CSC with n switchings less than ΔV are eliminated 456. Start with the non-dominated $CSC_i$ solution with the smallest number of capacitor status changes, $n_i$ (e.g., $n_i=1$). Compare this solution with the next non-dominated solution $CSC_{i+1}$ with a large number of capacitor status changes, $n_{i+1}$ (e.g., $n_{i+1}=2$) and test if $CSC_{i+1}$ provides the improvement in the voltage profile greater than a threshold ΔV (a user preference, e.g., 0.5V) using the equation:

$$[V_{CUR}-V_{CUR}{}^{CSCi+1}]-[V_{CUR}-V_{CUR}{}^{CSCi}]>\Delta V. \quad \text{(Eq. 3)}$$

If it does, keep $CSC_{i+1}$ non-dominated solution in the pool. If not, discard that solution and compare $CSC_{i+2}$ with CSCi. Continue this procedure until all non-dominated solutions have been tested. The non-dominated CSC having the highest value of ($V_{CUR}-V_{CSCi}$) is selected and a capacitor switching routine is executed 460. This CSC will facilitate attaining the flattest voltage on the feeder. However, the user may choose some other criteria to select the CSC, e.g., a CSC that gives the flattest voltage profile with no more than four capacitor switchings. The process returns to method step 412 for the next potential capacitor switching event.

If there are no remaining CSCs wherein $i>N_1$, the appropriate discrete determination is made. A next discrete determination is made 462 if the existing pf as determined in method step 410 is within limits. If it is, the temporal latency of $T_N$ is applied 440 and the process returns to method step 412. If the existing pf as determined in method step 410 is not within limits, an iterative function is executed starting with setting 464 to a value of "0". The value of i is increased 466 by "1". A discrete determination is made 468 if $i>N_1$, or not. If not, each $CSC_i$ wherein $pf^{CSCi}$ is outside of a predetermined range is eliminated 470. Method steps 466 through 470 are iterated until the discrete determination if $i>N_1$ is met, i.e., there are no further CSCs to evaluate. A discrete determination is made 472 if there are feasible CSCs from method step 452. If no, the temporal latency of $T_N$ is applied 440 and the process returns to method step 412. If yes, a CSC is found 474 having a minimum number of switching events, i.e., min $\{n_i\}$, and the capacitor switching routine is executed 460. The process returns to method step 412 for the next potential capacitor switching event.

CVVC portion 320 of monitoring and control system 200 facilitates maintaining EOL voltage levels within specification while facilitating flattening the voltage profile throughout feeder F1 and maintaining the power factor at the feeder level within electric distribution system 205. Such voltage flattening and power factor management facilitates reducing demand and consumption of electric power at the feeder level. Moreover, such feeder-level reductions in electric power demand and consumption facilitates reducing overall demand and consumption of electric power at the substation level. Furthermore, maintaining power factor within the desired limits at all feeders originating from the same substation translates into power factor within the same desired limits at the substation level, i.e., low side 306.

Additionally, if there are no designated capacitors associated with a feeder for power factor correction, i.e., capacitors installed close to the substation, CVVC portion 320 of monitoring and control system 200 facilitates reducing a number of capacitor switching operations compared to any solutions in which the two optimization objectives are achieved sequentially, e.g., voltage flattening first, and power factor optimization second.

Power Factor Determination and Control Algorithms and Methods (Without Combined Voltage Flattening)

In contrast to the combined power flattening and power factor determination and control described above, the algorithms and methods for determining and controlling power factor described below are executed subsequent to a voltage flattening sequence. Specifically, voltage flattening and power factor enhancement are performed in two discrete steps. The flattest voltage profile is defined as the profile with the smallest difference between the average voltage and the lowest voltage on the feeder, considering all voltage measurement points. However, in some alternative embodiments, a different method of determining voltage profile flatness may be used. The preliminary voltage flattening algorithms and methods used prior to the power factor management algorithms and methods primarily includes switching capacitor banks within each feeder separately. Prior to each capacitor switching event, CVVC portion 320 of monitoring and control system 200 (both shown in FIG. 3) determines the capacitor bank that will provide the flattest voltage within the associated feeder. For those feeders that include voltage regulators, provisions are made within the algorithms and method sequences to facilitate additional voltage flattening using the voltage regulators. Once sufficient voltage flattening has been achieved, the power factor control determination and control algorithms and methods are initiated.

As discussed above, power factor is determined by equation (1) above where P and Q are real and reactive power, respectively. Power factor can be either lagging (Q>0) or leading (Q<0). So, for every desired or target power factor $pf_T$ (user preference) there are values $Q_{TMIN}$ and $Q_{TMAX}$ that need to be calculated, so that we can establish a range for reactive power, wherein $Q_{TMIN}<Q<Q_{TMAX}$. The values for $Q_{TMIN}$ and $Q_{TMAX}$ are determined using:

$$Q_{TMAX}=P^*\tan(\arccos(pf_T)), \text{ and} \quad \text{(Eq. 4)}$$

$$Q_{TMIN}=-P^*\tan(\arccos(pf_T)). \quad \text{(Eq. 5)}$$

As seen from the equations above, there are two factors that affect the power factor, i.e., P and Q. Generally, we do not have any control over the customer load, so as P changes, in order to keep the power factor within desired limits, an operator is limited to only affecting the change of Q, e.g., by switching capacitors "ON" and "OFF". For practical purposes, capacitor 307 on substation bus 306, or capacitors C, on feeders F1 through F3 that are closer to substation 300, have negligible impact on the voltage profile of electric distribution system 205, and are mainly used for power factor correction (all shown on FIG. 3).

The algorithm for the power factor can be based on the following three cases (user preference): pf per feeder; pf at low side 306 of substation transformer 300; and pf at high side 304 of substation transformer 302.

Determining and Controlling Power Factor ($pf_F$) on the Feeder Algorithms and Methods In order to calculate power factor on the feeder, it is necessary to have measurements for real power (P) and reactive power (Q) for each feeder. power factor is determined by equation (1) above, where P and Q are the values for real and reactive power on the feeder. Capacitors used for power factor correction will be the capacitors that have the smallest effect on voltage profile. These capacitors will be close to substation 300, because those capacitors do not have significant impact on the voltage profile. We need to ensure that we address the situation where we would switch one capacitor in order to flatten the voltage and then, we would switch the same capacitor in order to improve the power factor. Such unnecessary switching decreases a useful life expectancy of the opening and closing devices, as well as increasing maintenance costs.

The target power factor $pf_T$ can be either leading or lagging. Some users might desire to have the target power factor both leading and lagging within certain limits (for example they might desire power factor to be 0.98 or better both leading and lagging). In that case, the $pf_{T1}=pf_{T2}$ and corresponding values are $|Q_{T\ MIN}|=Q_{T\ MAX}$. If the user preference is to have the power factor lagging at all times, then and $pf_{T2}=0$ and $Q_{T\ MIN}=0$. If the user preference is to have the power factor leading at all times, then $pf_{T1}=0$ and $Q_{T\ MAX}=0$. If the user wants to have the power factor such that it is not symmetrical, then $|Q_{T\ MIN}| \neq Q_{T\ MAX}$. If the values for the power factor are leading and lagging, then $pf_{T1}>0$ and $pf_{T2}<0$. If the values for the power factor are both lagging, then $pf_{T1}>pf_{T2}>0$. If the values for the power factor are both leading, then $pf_{T1}<pf_{T2}<0$.

Switching capacitors "ON" reduces the reactive power on that feeder by $Q_{Ci}$, while switching capacitor "OFF" increases the reactive power on the feeder by $Q_{Ci}$. If the current reactive power is $Q_{CUR}$ and capacitor has a rating of $Q_{Ci}$, then the values for reactive power after capacitor $C_i$ has been switched are:

$$\text{"ON"} \rightarrow \text{"OFF"}, Q_{NEW} = Q_{CUR} + Q_{Ci}, \text{ and} \quad (\text{Eq. 6})$$

$$\text{"OFF"} \rightarrow \text{"ON"}, Q_{NEW} = Q_{CUR} - Q_{Ci}. \quad (\text{Eq. 7})$$

Initially, obtain measurements for real power (P) and reactive power (Q) from the feeder. Obtain the value for target power factor $pf_{T1}$ and $pf_{T2}$ (user preference). Calculate the values for the maximum and minimum reactive powers $Q_{T\ MAX}$ and $Q_{T\ MIN}$, respectively, based on the target power factors $pf_{T1}$ and $pf_{T2}$, respectively, using equations (4) and (5), respectively. Calculate the feeder power factor $pf_F$ using equation (1) above.

Check to see if feeder power factor $pf_F$ is inside the desired target limits, i.e., $Q_{T\ MIN} \leq Q \leq Q_{T\ MAX}$, wherein such determination is made using the known relationships between power factor and reactive power. If the feeder power factor $pf_F$ is inside the desired target limits, then no further operational action is required. However, if the feeder power factor $pf_F$ is outside the desired target limits the following minor routine should be executed.

For feeders without voltage regulators on the line, the following routine is executed. Sort all available capacitor banks in the ascending order by calculating the difference between average voltage on the feeder and the lowest voltage on the feeder to determine the base condition. Do the same after each capacitor has been simulated to be switched in the alternate position. Find the absolute value of the difference between the two values. Sort the capacitor banks in ascending order of the calculated values. For those feeders without voltage regulators on the line, all available capacitors are sorted in ascending order as a function of distance from the substation.

If the power factor $pf_F$ is outside the desired target limits then check to see if $Q>Q_{MAX}$ or if $Q<Q_{MIN}$. If $Q>Q_{MAX}$, proceed as directly follows. If $Q<Q_{MIN}$, then use the method discussed further below after the case $Q>Q_{MAX}$ is discussed.

If $Q>Q_{MAX}$, calculate $\Delta Q = ||Q|-|Q_{MAX}||$.

Using the capacitors from the sorted capacitor bank table described above, and starting from the first capacitor in the table, determine all available capacitors that are OFF. Then, find all capacitors $C_i$ for which the expression $\Delta Q < QCi < \Delta Q + Q_{T\ MAX} + Q_{T\ MIN}$ holds.

If there are no capacitors for which the expression $\Delta Q < QCi < \Delta Q + Q_{T\ MAX} + |Q_{T\ MIN}|$ holds, then for every available capacitor that is OFF calculate:

$$\Delta Q_{Ci} = ||Q_{NEW\_Ci\_SWITCHED}|-|Q_{MAX}||, \\ (\text{if } Q_{NEW\_Ci\_SWITCHED} > 0), \text{ and} \quad (\text{Eq. 8})$$

$$\Delta Q_{Ci} = ||Q_{NEW\_Ci\_SWITCHED}|-|Q_{MIN}||, \\ (\text{if } Q_{NEW\_Ci\_SWITCHED} < 0), \quad (\text{Eq. 9})$$

wherein, when switching the capacitor from the OFF state to the ON state, $Q_{NEW\_Ci\_SWITCHED} = Q - Q_{Ci}$.

Next, find the capacitor from the sorted capacitor bank table described above with the lowest value for $\Delta Q_{Ci}$. Direct switching that particular capacitor from the OFF state to the ON state. Record a running average of the change of voltage at the recently switched capacitor over a predetermined time period, for example, without limitation, about 60 seconds. For those feeders with voltage regulators, verify if any of the timers associated with the voltage regulators are running. If none of the timers associated with the voltage regulators are running, then return to the beginning of the process, i.e., obtaining measurements for real power (P) and reactive power (Q) from the feeder. If some of the timers associated with the voltage regulators are running, then wait until the timers run out, allow the voltage regulators to change taps, and then return to the beginning of the process, i.e., obtaining measurements for real power (P) and reactive power (Q) from the feeder. For those feeders without voltage regulators, return to the beginning of the process as described above.

In the event that all available capacitors were used to attempt to attain the desired power factor, yet such desired power factor was not attained, a notification may be transmitted to a user to suggest determining if the feeder was designed with all capacitor bank sizes as needed.

If there is just one capacitor for which the expression $\Delta Q < QCi < \Delta Q + Q_{T\ MAX} + |Q_{T\ MIN}|$ holds, then direct switching that particular capacitor from the OFF state to the ON state. Record a running average of the change of voltage at the recently switched capacitor over a predetermined time period, for example, without limitation, about 60 seconds. For those feeders with voltage regulators, verify if any of the timers associated with the voltage regulators are running. If none of the timers associated with the voltage regulators are running, and then terminate the algorithm. If some of the timers associated with the voltage regulators are running, then wait until the timers run out, allow the voltage regulators to change taps, and then terminate the algorithm. For those feeders without voltage regulators, terminate the algorithm.

If there is more than one capacitor for which the expression $\Delta Q < QCi < \Delta Q + Q_{T\ MAX} + |Q_{T\ MIN}|$ holds, then select the capacitor that is physically closest to the substation. Direct switching that particular capacitor from the OFF state to the ON state. Record a running average of the change of voltage at the recently switched capacitor over a predetermined time period, for example, without limitation, about 60 seconds. For those feeders with voltage regulators, verify if any of the timers associated with the voltage regulators are running If none of the timers associated with the voltage regulators are running, then return to the beginning of the process, i.e., obtaining measurements for real power (P) and reactive power (Q) from the feeder. If some of the timers associated with the voltage regulators are running, then wait until the timers run out, allow the voltage regulators to change taps, and then return to the beginning of the process, i.e., obtaining measurements for real power (P) and reactive power (Q) from the feeder. For those feeders without voltage regulators, return to the beginning of the process as described above.

If $Q > Q_{MAX}$, calculate $\Delta Q = ||Q| - |Q_{MIN}||$.

Using the capacitors from the sorted capacitor bank table described above, and starting from the first capacitor in the table, determine all available capacitors that are ON. Then, find all capacitors $C_i$ for which the expression $\Delta Q < QC_i < \Delta Q + Q_{T\,MAX} + |Q_{T\,MIN}|$ holds.

If there are no capacitors for which the expression $\Delta Q < QC_i < \Delta Q + Q_{T\,MAX} + |Q_{T\,MIN}|$ holds, then for every available capacitor that is ON calculate:

$$\Delta Q_{Ci} = ||Q_{NEW\_Ci\_SWITCHED}| - |Q_{MAX}||,$$
$$(\text{if } Q_{NEW\_Ci\_SWITCHED} > 0), \text{ and} \quad \text{(Eq. 8)}$$

$$\Delta Q_{Ci} = ||Q_{NEW\_Ci\_SWITCHED}| - |Q_{MIN}||,$$
$$(\text{if } Q_{NEW\_Ci\_SWITCHED} < 0), \quad \text{(Eq. 9)}$$

wherein, when switching the capacitor from the ON state to the OFF state, $Q_{NEW\_Ci\_SWITCHED} = Q + Q_{Ci}$.

Next, find the capacitor from the sorted capacitor bank table described above with the lowest value for $\Delta Q_{Ci}$. Direct switching that particular capacitor from the OFF state to the ON state. Record a running average of the change of voltage at the recently switched capacitor over a predetermined time period, for example, without limitation, about 60 seconds. For those feeders with voltage regulators, verify if any of the timers associated with the voltage regulators are running. If none of the timers associated with the voltage regulators are running, then return to the beginning of the process, i.e., obtaining measurements for real power (P) and reactive power (Q) from the feeder. If some of the timers associated with the voltage regulators are running, then wait until the timers run out, allow the voltage regulators to change taps, and then return to the beginning of the process, i.e., obtaining measurements for real power (P) and reactive power (Q) from the feeder. For those feeders without voltage regulators, return to the beginning of the process as described above.

In the event that all available capacitors were used to attempt to attain the desired power factor, yet such desired power factor was not attained, a notification may be transmitted to a user to suggest determining if the feeder was designed with all capacitor bank sizes as needed.

If there is just one capacitor for which the expression $\Delta Q < QC_i < \Delta Q + Q_{T\,MAX} + |Q_{T\,MIN}|$ holds, then direct switching that particular capacitor from the ON state to the OFF state. Record a running average of the change of voltage at the recently switched capacitor over a predetermined time period, for example, without limitation, about 60 seconds. For those feeders with voltage regulators, verify if any of the timers associated with the voltage regulators are running. If none of the timers associated with the voltage regulators are running, then return to the beginning of the process, i.e., obtaining measurements for real power (P) and reactive power (Q) from the feeder. If some of the timers associated with the voltage regulators are running, then wait until the timers run out, allow the voltage regulators to change taps, and then terminate the algorithm. For those feeders without voltage regulators, terminate the algorithm.

If there is more than one capacitor for which the expression $\Delta Q < QC_i < \Delta Q + Q_{T\,MAX} + |Q_{T\,MIN}|$ holds, then select the capacitor that is physically closest to the substation. Direct switching that particular capacitor from the ON state to the OFF state. Record a running average of the change of voltage at the recently switched capacitor over a predetermined time period, for example, without limitation, about 60 seconds. For those feeders with voltage regulators, verify if any of the timers associated with the voltage regulators are running. If none of the timers associated with the voltage regulators are running, then return to the beginning of the process, i.e., obtaining measurements for real power (P) and reactive power (Q) from the feeder. If some of the timers associated with the voltage regulators are running, then wait until the timers run out, allow the voltage regulators to change taps, and then terminate the algorithm. For those feeders without voltage regulators, terminate the algorithm.

Determining and Controlling Power Factor (pf) on the Low Side of the Substation Transformer Algorithms and Methods As noted above, real power (P) and reactive power (Q) are always measured on low side 306 of substation transformer 306 (both shown in FIG. 3). Therefore, equation (1) is used to determine low side power factor $pf_{LS}$ using the measured values for $P_{LS}$ and $Q_{LS}$.

Initially, all available capacitors on all feeders are determined, and then sorted in an ascending order using the following methods. A difference between an average voltage and a lowest voltage within feeder F1 is calculated to determine the base condition. A series of successive simulated capacitor switching operations from the existing state to the opposite state are performed. After each simulated capacitor switching event, repeat determining the difference between the average voltage and the lowest voltage within feeder F1. Then, the absolute value of the difference (Δ) between the two values is determined for each simulated switching event. A table is generated and populated with a list of the capacitors that are sorted in ascending order of the values of Δ. The switching order of the capacitors is determined by the sorted list, i.e., switching is started with the capacitor at the top of the table.

A first method of capacitor switching selection includes selecting the feeder with the worst power factor from the aforementioned capacitor switching priority list, and capacitor switching will begin with the associated feeder. A second method of capacitor switching selection includes determining which feeder has the most available capacitors and start switching them based on the distance from substation (closest capacitor banks shall be switched first). A third method of capacitor switching selection includes performing a Pareto analysis. In the exemplary embodiment, the first method is described.

Switching a capacitor "ON" reduces the reactive power on that feeder by $Q_{Ci}$, while switching the capacitor "OFF" increases the reactive power on the feeder by $Q_{Ci}$. If the current reactive power is $Q_{CUR}$ and the capacitor has a rating of $Q_{Ci}$, then the values for reactive power after capacitor $C_i$ has been switched are:

$$\text{"ON"} \rightarrow \text{"OFF"}, Q_{NEW} = Q_{CUR} + Q_{Ci}, \text{ and} \quad \text{(Eq. 6)}$$

$$\text{"OFF"} \rightarrow \text{"ON"}, Q_{NEW} = Q_{CUR} - Q_{Ci}. \quad \text{(Eq. 7)}$$

The current power factor on the feeder can be expressed as:

$$pf_{LS} = P_{LS}/\sqrt{(P_{LS}^2 + Q_{LS}^2)}, \quad \text{(Eq. 10)}$$

then switching the capacitor "ON" will result in a new power factor:

$$pf_{LS}=P_{LS}/\sqrt{[P_{LS}^2+(Q_{LS}-Q_{Ci})^2]}, \qquad (Eq. 11)$$

and switching the capacitor "OFF" will result in a new power factor:

$$pf_{LS}=P_{LS}/\sqrt{[P_{LS}^2+(Q_{LS}+Q_{Ci})^2]}. \qquad (Eq. 12)$$

Measurements for real power (P) and reactive power (Q) are obtained from low side 306 of substation transformer 302, i.e., $P_{LS}$ and $Q_{LS}$. The value for target power factor $pf_T$ (user preference) is obtained. The values for the maximum and minimum reactive powers $Q_{T\ MAX}$ and $Q_{T\ MIN}$, respectively, are determined using equations (4) and (5), respectively. The current feeder power factor $pf_{LS}$ is calculated using equation (10) above.

A determination is made if power factor $pf_{LS}$ is inside the desired target limits, i.e., $Q_{T\ MIN} \leq Q_{LS} \leq Q_{T\ MAX}$, wherein such determination is made using the known relationships between power factor and reactive power. If the power factor $pf_{LS}$ is inside the desired target limits then no further operational action is required. If the power factor $pf_{LS}$ is outside the desired target limits, then the following sequence is executed.

The number of capacitor banks and reactive power available for every capacitor bank ($Q_{CS1}, Q_{CS2} \dots$) coupled to the substation transformer is determined. If there is at least one substation capacitor bank, for every substation capacitor bank that is available, a new low side reactive power is calculated after the capacitor is switched used the following:

$$\text{"ON"} \rightarrow \text{"OFF"}, Q_{NEW}=Q_{LS\_Measured}+Q_{CSi}, \text{ and} \qquad (Eq. 13)$$

$$\text{"OFF"} \rightarrow \text{"ON"}, Q_{NEW}=Q_{LS\_Measured}-Q_{Ci}. \qquad (Eq. 14)$$

A determination is made if the measured value of reactive power on low side 306 of transformer 302, i.e., $Q_{LS\_NEW}$ is within the limits as described above. If $Q_{LS\_NEW}$ is within the limits $Q_{T\ MIN} \leq Q_{LS} \leq Q_{T\ MAX}$, then the substation capacitor bank $C_i$ that results in the pf to be within the target limits is selected for switching. If there is more than one capacitor bank for which this holds, then the capacitor that results in the pf to be the closest to midrange of the desired power factor is selected for switching. If more of them result in the same pf, then an arbitrary selection criterion is used, for example, without limitation, the capacitor which has the lower number identifier on a substation one-line diagram is selected. A temporal latency period $t=T_D$ is used and the method restarts at obtaining measurements for real power (P) and reactive power (Q) from low side 306 of substation transformer 302, i.e., $P_{LS}$ and $Q_{LS}$.

If $Q_{LS\_NEW}$ is outside the limits $Q_{T\ MIN} \leq Q_{LS} \leq Q_{T\ MAX}$, and if a single substation capacitor bank cannot bring the target power factor within the target limits, then a determination is made if switching that capacitor bank will improve the power factor or make it worse comparing to the desired power factor.

If the power factor will improve by switching the substation capacitor bank then, the capacitor that results in power factor being closest to the desired power factor is switched. A temporal latency period $t=T_D$ is used and the method restarts at obtaining measurements for real power (P) and reactive power (Q) from low side 306 of substation transformer 302, i.e., $P_{LS}$ and $Q_{LS}$.

If switching substation capacitor bank causes power factor to worsen, or if there are no available capacitor banks, then the values for real (P) and reactive (Q) power for each feeder are obtained and a power factor for each, i.e., $pf_{Fi}$ is determined. For each feeder, an error $\xi$ is calculated from by determining the absolute value of the difference between $pf_T$ and $pf_{Fi}$. A feeder ranking table is generated, wherein the feeders are ranked, from worst to best, with respect to error $\xi$. Note, that if a feeder is within the limits, the error $\xi$ is 0.

For each feeder, assume that we want to obtain the same power factor $pf_T$ and calculate $\Delta Q_{min}$ and $\Delta Q_{max}$ such that if $Q_{FEEDER} < \Delta Q_{min}$:

$$\Delta Q_{min}=|Q_{FEEDER}-Q_{T\ MIN}|, \text{ or} \qquad (Eq. 15)$$

$$\Delta Q_{max}=|\Delta Q_{min}+Q_{T\ MAX}-Q_{T\ MIN}|. \qquad (Eq. 16)$$

Also, if $Q_{FEEDER} > \Delta Q_{max}$:

$$\Delta Q_{min}=|Q_{FEEDER}-Q_{T\ MAX}|, \text{ or} \qquad (Eq. 17)$$

$$\Delta Q_{max}=|\Delta Q_{min}+|Q_{T\ MAX}-Q_{T\ MIN}||. \qquad (Eq. 16)$$

FIG. 10 is a tabular view, i.e., a table 500 of capacitive device suitability at the feeder level per feeder. For each feeder, the availability and status of each of the capacitor banks within the associated feeder are verified, and a feeder table 500 that contains 1's and 0's to designate suitability is generated. The 1's designate that switching that particular capacitor can bring the power factor on the feeder within the limits, and the 0's indicate that this is not possible.

FIG. 11 is a tabular view, i.e., a table 510 of capacitive device suitability at the substation level per feeder. For the substation, the availability and status of each of the capacitor banks on all feeders are verified, and a substation table 510 that contains 1's and 0's to designate suitability is generated. The 1's designate that switching that particular capacitor can bring the power factor on the low side of the substation transformer within the limits, and the 0's indicate that this is not possible.

FIG. 12 is a tabular view, i.e., a table 520 of capacitive device suitability at both the feeder level and the substation level per feeder. A final table 520 based on conjoining the two tables above is generated. This table 520 will determine if there are any capacitors that fix both feeder power factor and substation transformer low-side power factor. Here, capacitor $C_3$ of feeder $F_4$ and capacitor $C_1$ of feeder $F_2$ meet both requirements.

If final table 520 is not empty, i.e., there are some 0's and some 1's, then the capacitor from the feeder with the worst power factor is elected and switched. A temporal latency period $t=T_D$ is used and the method restarts at obtaining measurements for real power (P) and reactive power (Q) from low side 306 of substation transformer 302, i.e., $P_{LS}$ and $Q_{LS}$.

Alternatively, if final table 520 is empty, i.e., all 0's, then substation table 510 is evaluated if it is empty or not. If substation table 520 is not empty, then the capacitor from the feeder with the worst power factor is selected and switched. A temporal latency period $t=T_D$ is used and the method restarts at obtaining measurements for real power (P) and reactive power (Q) from low side 306 of substation transformer 302, i.e., $P_{LS}$ and $Q_{LS}$.

If substation table 510 is empty, then feeder table 500 is evaluated if it is empty or not. If feeder table 500 is not empty, then the capacitor from the feeder with the worst power factor is selected and switched. A temporal latency period $t=T_D$ is used and the method restarts at obtaining measurements for real power (P) and reactive power (Q) from low side 306 of substation transformer 302, i.e., $P_{LS}$ and $Q_{LS}$. If feeder table 500 is empty, then the bank(s) that improve the power factor the most are determined from all available capacitor banks. If there are no capacitor banks determined, then the method is terminated and the method restarts at obtaining measurements for real power (P) and reactive power (Q) from low side 306 of substation transformer 302, i.e., $P_{LS}$ and $Q_{LS}$.

If there is only one capacitor bank determined, the capacitor is selected and switched. A temporal latency period $t=T_D$ is used and the method restarts at obtaining measurements for real power (P) and reactive power (Q) from low side 306 of substation transformer 302, i.e., $P_{LS}$ and $Q_{LS}$. If there are additional capacitor banks that satisfy this condition, then the capacitor from the feeder with the worst power factor is selected and switched. A temporal latency period $t=T_D$ is used and the method restarts at obtaining measurements for real power (P) and reactive power (Q) from low side 306 of substation transformer 302, i.e., $P_{LS}$ and $Q_{LS}$.

If there are additional capacitor banks from the feeder with the worst power factor, then the capacitor that is closest to the substation and is selected and switched. A temporal latency period $t=T_D$ is used and the method restarts at obtaining measurements for real power (P) and reactive power (Q) from low side 306 of substation transformer 302, i.e., $P_{LS}$ and $Q_{LS}$.

Determination and Control of Power Factor (pf) at High Side of the Substation Transformer Algorithms and Methods If the objective is to keep the power factor within some range on high side 304 of transformer 302, then the measurements for P and Q on the high side of the transformer, i.e., $P_{HS}$ and $Q_{HS}$, are required to determine $pf_{HS}$. This presents a challenge, since typically these values are not measured. However, P and Q are always measured on low side 306 of substation transformer 302, so knowing the values for $P_{LS}$ and $Q_{LS}$ and the transformer impedance, we can derive the formula for the power factor on the high side of the transformer:

$$pf_{HS} = \cos[(\arctan Q_{HS})/P_{HS}]. \quad \text{(Eq. 18)}$$

(1) denotes the high side of the transformer and (2) denotes the low side of the transformer. The following expressions are used to calculate the secondary 3Φ real load power, reactive power, and secondary, i.e., low side (2) bus voltage relative to the new base values:

$$P_2 = P_2{}^{3\Phi}/S_B{}^{3\Phi}, \quad \text{(Eq. 19)}$$

$$Q_2 = Q_2{}^{3\Phi}/S_B{}^{3\Phi}, \text{ and} \quad \text{(Eq. 20)}$$

$$V_2 = V_2{}^{11}/V_{2B}{}^{11}. \quad \text{(Eq. 21)}$$

where $S_B{}^{3\Phi} = 100\text{MVA}$, $P_2{}^{3\Phi}$ is the measured value for real power on low side 306 of transformer 302, $Q_2{}^{3\Phi}$ is the measured value for reactive power on low side 306 of transformer 302, $V_2{}^{11}$ is the measured value for line-to-line voltage on low side 306 of transformer 302, and $V_{2B}{}^{11}$ is the base value for the voltage on low side 306 of transformer 302, that corresponds to a nameplate value.

The high side (1) per unit value of the 3Φ active and reactive power into the transformer are calculated using the following:

$$P_1 = P_2 + R^*[(P_2{}^2 + Q_2{}^2)/V_2{}^2], \text{ and} \quad \text{(Eq. 22)}$$

$$Q_1 = Q_2 + X^*[(P_2{}^2 + Q_2{}^2)/V_2{}^2], \quad \text{(Eq. 23)}$$

wherein, R and X are per unit resistance and reactance values for the substation transformer.

Transformer core losses and impedance are neglected between the low side of the transformer and the low side bus. The actual high side (1) active and reactive power injected into the transformer is calculated by:

$$P_1{}^{3\Phi} = P_1 * S_B{}^{3\Phi}, \text{ and} \quad \text{(Eq. 24)}$$

$$Q_1{}^{3\Phi} = Q_1 * S_B{}^{3\Phi}. \quad \text{(Eq. 25)}$$

Switching a capacitor "ON" reduces the reactive power on that feeder by $Q_{Ci}$, while switching the capacitor "OFF" increases the reactive power on the feeder by $Q_{Ci}$. If the current reactive power is $Q_{CUR}$ and the capacitor has a rating of $Q_{Ci}$, then the values for reactive power after capacitor $C_i$ has been switched are:

$$\text{"ON"} \rightarrow \text{"OFF"}, Q_{NEW} = Q_{CUR} + Q_{Ci}, \text{ and} \quad \text{(Eq. 6)}$$

$$\text{"OFF"} \rightarrow \text{"ON"}, Q_{NEW} = Q_{CUR} - Q_{Ci}. \quad \text{(Eq. 7)}$$

Measurements for real power (P) and reactive power (Q) are obtained from low side 306 of substation transformer 302, i.e., $P_{LS}$ and $Q_{LS}$. The value for target power factor $pf_T$ (user preference) is obtained. The values for the maximum and minimum reactive powers $Q_{T\_MAX}$ and $Q_{T\_MIN}$, respectively, are determined using equations (4) and (5), above, respectively. The current feeder power factor $pf_{LS}$ is calculated using equation (10) above.

Using the values for $pf_T$, equations (22) and (23), and measured values for $P_{LS}$ and $Q_{LS}$, the equivalent power factor $pf_{LS}$ is calculated based on the desired power factor on the high side (2) $pf_T$. Then, a determination is made if the equivalent power factor $pf_{LS}$ is inside the desired target limits, i.e., $Q_{T\_MIN} < Q_{LS}{}^{TARGET} < Q_{T\_MAX}$. If $Q_{LS}$ is inside the desired target limits, then no further operational action is required. If $Q_{LS}$ is outside the desired target limits, then use the methodology described above for the low side of the transformer using the new values for $Q_{T\_MIN}$ and $Q_{T\_MAX}$.

The power factor determination algorithms, methods, and routines as described herein are used to determine an enhanced, or improved switching sequence of capacitors that will facilitate maintaining the power factor within the desired limits. Keeping power factor within the limits results in lower losses within the distribution system, thereby improving overall system efficiency. The power factor determination algorithms, methods, and routines as described herein encompass determining and controlling power factor on the feeder, power factor on the low side of the transformer, and power factor on the high side of the transformer. In addition, the capacitor bank in the substation may also be used as a device for power factor correction, in addition to all capacitors in the field.

Voltage Reduction Algorithms and Methods

In the exemplary embodiment, once the voltage profile has been flattened throughout electric distribution system 205, and the power factor has been modulated accordingly, a voltage reduction algorithm and methods are executed to reduce the voltage throughout system 205. Voltage reduction can be done in three ways, i.e., transformer 302 with a load tap changer (LTC), voltage regulator, e.g., VR1, and substation capacitor bank 307.

The LTC reduces the voltage on all feeders and on all phases at the same time in discrete steps. Voltage regulators change voltages only on the feeder that they are associated with. The substation capacitor bank can only change the voltage in a discrete step(s), which depends on the size of the bank. However, if we have a substation capacitor bank, we will utilize different algorithms for CVVC that are based on the minimum average voltage on the whole feeder, so this bank will most likely not be used for voltage reduction.

The purpose of the voltage reduction is to reduce the voltage on the system such that the power efficiencies described herein may be further facilitated, while maintaining all voltages, including EOL voltages, within specification. Therefore, reductions in electric power consumption are facilitated.

Telemetry-based Volt/VAR Algorithms and Methods

Figure 13:
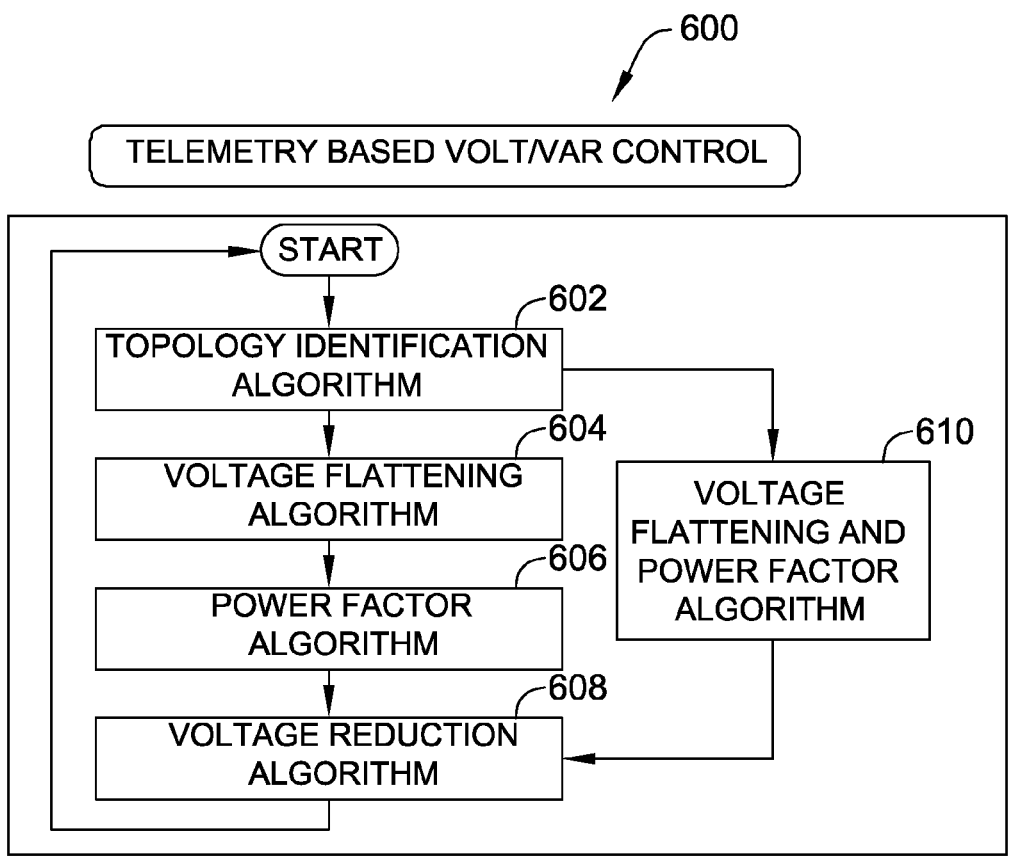
FIG. 13 is a flow chart of an exemplary method of executing telemetry-based Volt/Var control of the electric distribution system shown in FIG. 3.

FIG. 13 is a flow chart of an exemplary method 600 of executing telemetry-based Volt/Var control of electric distribution system 205 (shown in FIG. 3). The telemetry-based Volt/VAR algorithms and methods describe the CVVC optimization routine and possible sequence that can be utilized when applying this algorithm. CVVC optimization works as follows (2 ways) as defined by user preference. Such telemetry-based Volt/VAR algorithm and methods facilitate eliminating a need for extensive system modeling, which requires a significant amount of computing resources. Therefore, the CVVC optimization as described herein uses direct inputs from the field with some forecasting to enable CVVC portion 320 of monitoring and control system 200 as described herein. Therefore, system latencies are significantly reduced, thereby facilitating timely control of the field devices and reducing costs of computing resources.

The first option includes executing 602 the topology identification algorithms and methods as described above to identify the devices that will be controlled by CVVC portion 320 of monitoring and control system 200. A voltage flattening algorithm is executed 604, which results in a certain number of capacitors being switched ON/OFF. The object of this routine is to flatten the voltage switching operations of capacitor banks, without any regard to power factor. After the voltage flattening algorithm is completed, the separate power factor algorithm is executed 606. This algorithm defines the switching sequence that will correct the power factor if the voltage flattening algorithm has caused it to go outside the limits. At the end, a voltage reduction algorithm is executed 608 to reduce the voltage.

The second option includes executing 602 the topology identification algorithms and methods as described above to identify the devices that will be controlled by CVVC portion 320 of monitoring and control system 200. The combined voltage flattening and power factor algorithm is executed 610, which defines the capacitor switching sequence which results in voltage flattening such that the power factor does not go outside the desired limits. This algorithm is different from the separate and distinct voltage flattening algorithm and power factor algorithm described above for the first option, because it has to satisfy two objectives, rather than one. At the end, a voltage reduction algorithm is executed 608 to reduce the voltage.

Figure 14:
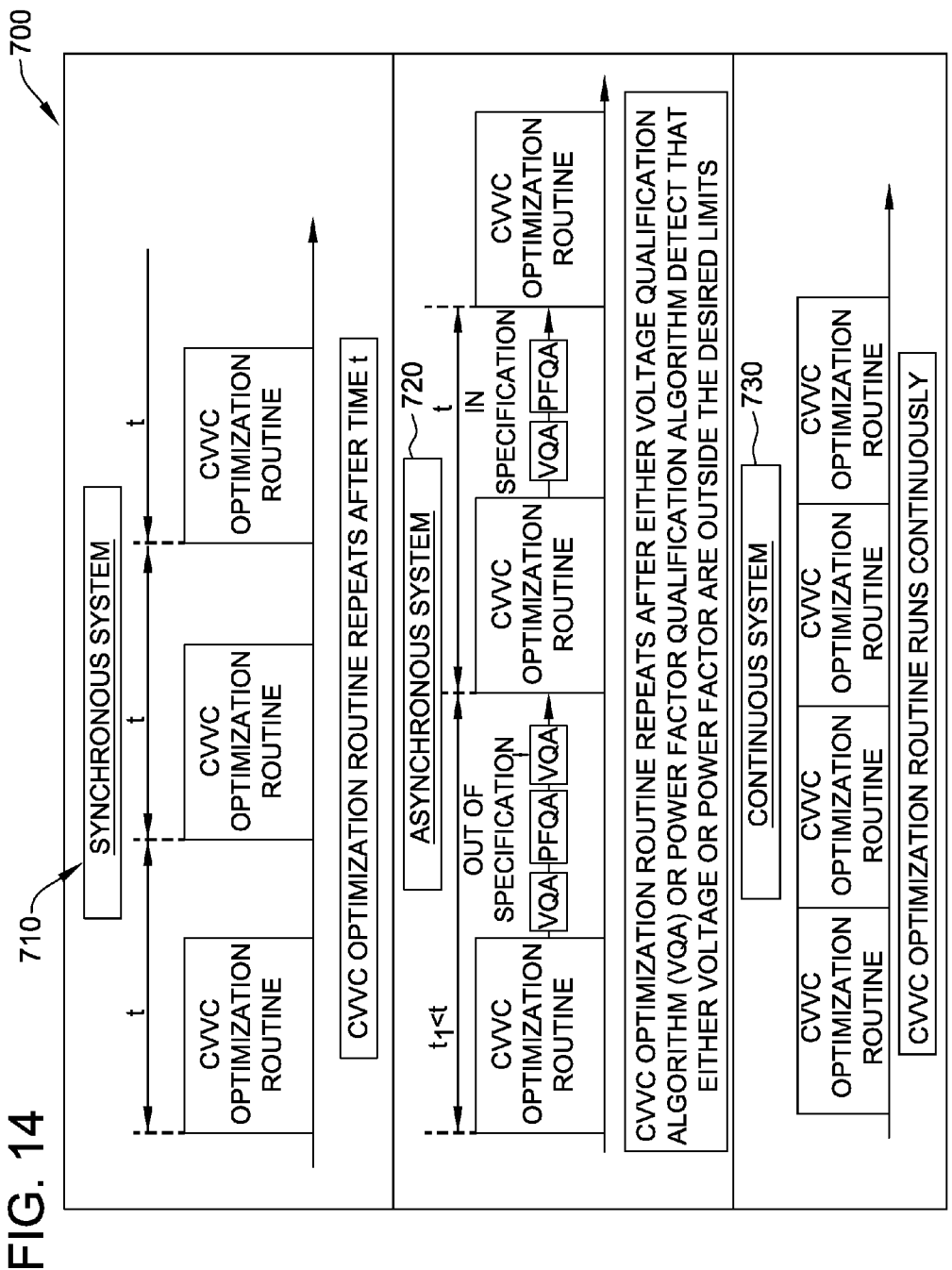
FIG. 14 is a graphical view of sequences that may be used with the method of executing the telemetry-based Volt/Var control shown in FIG. 13.

FIG. 14 is a graphical view of sequences 700 that may be used with the method of executing telemetry-based Volt/Var control (shown in FIG. 13). After we define the preferred routine for CVVC optimization routine, we have to define the sequence in which the routine will be applied throughout the day. Since load on the feeder changes incrementally, user can decide how often they want to run the CVVC Optimization Routine. Before the CVVC routine starts, a substation transformer bus voltage monitoring algorithm is executed, wherein this step can be skipped based on the user preference. After this algorithm has finished, there are three possible user-selected sequences.

The first sequence 710 is a synchronous system routine, i.e., a CVVC routine that is executed after a predetermined time t throughout the day. The time t is a user-defined value, e.g., 15 minutes, 30 minutes, and 1 hour. The synchronous system routine must be selected to run continuously, regardless of load conditions on system 205.

The second sequence 720 is an asynchronous system routine, i.e., a CVVC routine is executed after time t. The time t is a user-defined value, e.g., 15 minutes, 30 minutes, and 1 hour. However, in between the application of the CVVC optimization routine, a voltage qualification algorithm (VQA), i.e., a $V_{MIN}$ or $V_{MAX}$ parameter is exceeded at any measurement point for a predefined period of time, and a power factor qualification algorithm (PFQA), i.e., a power factor parameter is exceeded for a predefined period of time, are running alternately in order to check if there is any voltage out of specification or power factor out of specification. Based on the user preference, if any of the algorithms detect either of the two out of specification conditions prior to time t, then the CVVC optimization routine will be executed. Sometimes, a user can choose only to have either VQA or PFQA algorithms running and not both. If there are no out of specification conditions, the CVVC routine executes substantially always after time t. If either a voltage or a VAR out of specification condition occurs, and the CVVC routine is executed, the timer t resets. The asynchronous system routine may be selected to run during light, off-peak loading conditions on system 205.

The third sequence 730 is a continuous system sequence, wherein the CVVC routine runs substantially continuously. The continuous system sequence may be selected to run during peak loading conditions on system 205.

In contrast to known voltage flattening and power factor control systems, the methods, systems, and apparatus described herein provide maintaining EOL voltage levels within specification while flattening the voltage profile throughout a feeder. Additionally, in contrast to known voltage flattening and power factor control systems, the methods, systems, and apparatus described herein facilitate maintaining the power factor within predetermined parameters at the feeder level within the electric distribution system. Also, in contrast to known voltage flattening and power factor control systems, the monitoring methods, systems, and apparatus described herein facilitates reducing a number of capacitor switching operations compared to any solutions in which the two optimization objectives are achieved sequentially, e.g., voltage flattening first, and power factor optimization second. Such reduction in switching operations facilitates decreasing maintenance costs and extending a useful life expectancy of the opening and closing devices.

Further, in contrast to known voltage flattening and power factor control systems, the monitoring methods, systems, and apparatus described herein facilitates decentralizing the CVVC Volt/Var enhancing control system by using direct, real-time, actual inputs from the field enabling a more localized control of the electric distribution system, thereby eliminating operational data transfer across long distances, and decreasing operational temporal latencies. Such telemetry-based Volt/VAR algorithm and methods also facilitate eliminating a need for extensive system modeling, which requires a significant amount of computing resources. Therefore, in addition to system latencies being significantly reduced, timely control of the field devices is facilitated, costs of computing resources are reduced.

Such voltage flattening and power factor management facilitates reducing demand and consumption of electric power at the feeder level. Moreover, such feeder-level reductions in electric power demand and consumption facilitates reducing overall demand and consumption of electric power at the substation level. Furthermore, maintaining the power factor within the desired limits at all feeders originating from the same substation translates into controlling the power factor within the same desired limits at the substation level.

An exemplary technical effect of the methods, systems, and apparatus described herein includes at least one of (a) enabling maintaining EOL voltage levels within specification while flattening a voltage profile throughout a feeder; (b) enabling maintaining the power factor within predetermined parameters at the feeder level within the electric distribution system; (c) enabling both (a) and (b) above using a single set of algorithms; (d) enabling determining and controlling the power factor on the feeder, the power factor on the low side of the transformer, and the power factor on the high side of the transformer; and (e) decreasing temporal latencies associated with the monitoring and control of the electric distribution system.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A system for enhancing decentralized coordinated Volt/Var control (CVVC), said system comprising:
    a memory device configured to store a plurality of operational measurements of an electric distribution system, the electric distribution system includes a plurality of capacitive devices; and
    a processor coupled in communication with said memory device, said processor programmed to:
        determine a plurality of potential configurations for the plurality of capacitive devices; and
        determine a priority of switching of each capacitive device of the plurality of capacitive devices as a function of:
            a plurality of actual voltage measurements of the electric distribution system that at least partially define a voltage profile of the electric distribution system, wherein the voltage profile of the electric distribution system includes an average voltage value of the electric distribution system and a lowest voltage value of the electric distribution system;
            at least one power factor determination of the electric distribution system; and
            flattening the voltage profile of at least a portion of the electric distribution system and enhancing a power factor of the electric distribution system, wherein flattening the voltage profile includes reducing a difference between the average voltage value of the electric distribution system and the lowest voltage value of the electric distribution system.

2. A system in accordance with claim 1, wherein the plurality of potential configurations for the plurality of capacitive devices comprises a plurality of capacitor switching combinations (CSCs), wherein each CSC comprises those capacitive devices of the plurality of capacitive devices available for switching as a function of at least one of capacitor switch timing devices and capacitor switch counting devices.

3. A system in accordance with claim 2, further comprising at least one feasible CSC, wherein said at least one feasible CSC comprises at least one capacitive device of the plurality of capacitive devices that facilitates maintaining at least one voltage value of the electric distribution system within predetermined parameters as a function of:
    when the at least one capacitive device of the plurality of capacitive devices is switched from an ON status to an OFF status; and
    when the at least one capacitive device of the plurality of capacitive devices is switched from an OFF status to an ON status.

4. A system in accordance with claim 2, wherein said at least one power factor determination of the electric distribution system comprises a power factor determination for the low side of a transformer associated with individually operating each capacitive device of the plurality of capacitive devices.

5. A system in accordance with claim 2, wherein said processor is further programmed to eliminate a CSC from consideration as a feasible CSC as a function of at least one of:
    at least one CSC comprising at least one capacitive device of the plurality of capacitive devices that induces a decrease of a voltage of the electric distribution system below a predetermined parameter upon a change of status of the at least one capacitive device of the plurality of capacitive devices; and
    at least one CSC comprising at least one capacitive device of the plurality of capacitive devices that induces an increase of a voltage of the electric distribution system above a predetermined parameter upon a change of status of the at least one capacitive device of the plurality of capacitive devices.

6. A system in accordance with claim 2, wherein said processor is further programmed to eliminate CSCs from consideration as a feasible CSC as a function of at least one of:
    at least one CSC comprising at least one capacitive device of the plurality of capacitive devices that induces a change of a power factor of the electric distribution system outside of a predetermined range defined by predetermined parameters upon a change of status of the at least one capacitive device of the plurality of capacitive devices; and
    a first CSC comprising a first number of switches, a second CSC comprising a second number of switches, the first number of switches is greater than the second number of switches.

7. A system in accordance with claim 1, wherein said processor is further programmed to:
    switch the at least one capacitive device of the plurality of capacitive devices from an OFF status to an ON status; and switch the at least one capacitive device of the plurality of capacitive devices from an ON status to an OFF status.

8. A system for enhancing decentralized coordinated Volt/Var control (CVVC), said system comprising:
 a memory device configured to store a plurality of actual measurements of an electric distribution system, the electric distribution system includes at least one feeder that includes a plurality of capacitive devices; and
 a processor coupled in communication with said memory device, said processor programmed to:
  determine an actual power factor for the at least one feeder;
  determine if the actual power factor for the at least one feeder is within predetermined feeder power factor parameters;
  determine an average voltage value of the at least one feeder;
  determine a lowest voltage value of the at least one feeder;
  determine a difference value between the average voltage value of the at least one feeder and the lowest voltage value of the at least one feeder;
  determine a priority of each capacitive device available for switching from the plurality of capacitive devices as a function of a voltage flattening effect on the feeder, wherein the voltage flattening effect is substantially a function of reducing the difference between the average voltage value on the at least one feeder and the lowest voltage value on the at least one feeder;
  determine a range between predetermined feeder reactive power parameters;
  determine a range of reactive power values between actual reactive power on the at least one feeder and a target value for reactive power on the at least one feeder;
  determine a reactive power value for each available capacitive device of the plurality of capacitive devices; and
  command at least one available capacitive device of the plurality of capacitive devices to switch.

9. A system in accordance with claim 8, wherein said processor is further programmed to determine the status of each available capacitive device of the plurality of capacitive devices as an OFF status or an ON status.

10. A system in accordance with claim 8, wherein said processor is further programmed to determine a range of reactive power values for the at least one feeder as a function of at least one of the predetermined power factor parameters.

11. A system in accordance with claim 10, wherein said processor is further programmed to determine if the reactive power value for each available capacitive device of the plurality of capacitive devices is within the range of reactive power values associated with the predetermined power factor parameters for the at least one feeder.

12. A system in accordance with claim 11, wherein said processor is further programmed to
 determine if at least one available capacitive device of the plurality of capacitive devices has a differential reactive power value within the range of reactive power differential values for the at least one feeder, and if there is not at least one available capacitive device of the plurality of capacitive devices having a differential reactive power value within the range of reactive power differential values associated with the predetermined power factor parameters for the at least one feeder, then determine a post-switching differential reactive power value for each of the available capacitive devices of the plurality of capacitive devices for the at least one feeder.

13. A system in accordance with claim 11, wherein said processor is further programmed to determine which capacitive device of the available capacitive devices provides the lowest determined feeder reactive power value when switched.

14. A system for enhancing decentralized coordinated Volt/Var control (CVVC), said system comprising:
 a memory device configured to store a plurality of operational measurements of an electric distribution system, the electric distribution system includes a substation, a transformer, a plurality of feeders coupled to the transformer, and a plurality of capacitive devices in each feeder; and
 a processor coupled in communication with said memory device, said processor programmed to:
  determine an actual power factor for a low side of the transformer and an actual power factor for each feeder of the plurality of feeders;
   flattening a voltage profile of each feeder of the plurality of feeders through reducing the difference between the average voltage value and the lowest voltage value thereof.

15. A system in accordance with claim 14, wherein said processor is further programmed to determine a number of capacitive devices of the plurality of capacitive devices associated with the substation and positioned upstream of the plurality of feeders.

16. A system in accordance with claim 15, wherein said processor is further programmed to determine a forecasted power factor for the low side of the transformer for every capacitive device of the plurality of capacitive devices associated with the substation.

17. A system in accordance with claim 16, wherein said processor is further programmed to select at least one of the substation capacitive devices for changing the actual value of the power factor for the low side of the transformer to an actual value that is within the predetermined transformer low side power factor parameters.

18. A system in accordance with claim 14, wherein said processor is further programmed to:
 determine an actual power factor value for each feeder of the plurality of feeders;
 determine a target feeder power factor value for each feeder of the plurality of feeders; and
 determine a feeder power factor error value between each target feeder power factor value and each actual feeder power factor value.

19. A system in accordance with claim 18, wherein said processor is further programmed to prioritize the plurality of feeders with respect to a magnitude of the feeder power factor error values,
 determine a forecasted power factor for each of the plurality of feeders as a function of a status and an availability of the plurality of capacitive devices in each feeder of the plurality of feeders;
 determine if each of the actual power factors for each feeder of the plurality of feeders and the forecasted power factors for each feeder of the plurality of feeders are within predetermined feeder power factor parameters;
 determine a forecasted power factor for the low side of the transformer as a function of the status and the availability of the plurality of capacitive devices in each feeder of the plurality of feeders;

determine if each of the actual power factor for the low side of the transformer and the forecasted power factor for the low side of the transformer are within predetermined transformer low side power factor parameters;

determine an average voltage value of each feeder of the plurality of feeders;

determine a lowest voltage value of each feeder of the plurality of feeders;

for each feeder of the plurality of feeders, determine a difference value between the average voltage value of the feeder and the lowest voltage value of the feeder; and determine a switching priority for each capacitive device of the plurality of capacitive devices as a function of:
  a comparison between the actual and forecasted power factors determined for the plurality of feeders and the actual and forecasted power factors determined for the low side of the transformer; and

20. A system in accordance with claim 14, wherein the transformer further includes a high side, wherein said processor is further programmed to determine and control an actual power factor on the high side of the transformer.

\* \* \* \* \*